(12) United States Patent
Phogat et al.

(10) Patent No.: US 11,227,419 B2
(45) Date of Patent: Jan. 18, 2022

(54) REMOVING ANCHOR POINTS FROM A PATH WHILE REDUCING DEVIATION OF THE PATH

(71) Applicant: Adobe Inc., San Jose, CA (US)

(72) Inventors: Ankit Phogat, Noida (IN); Vineet Batra, Pitam Pura (IN); Daniel Kaufman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/834,590

(22) Filed: Mar. 30, 2020

(65) Prior Publication Data

US 2021/0304464 A1 Sep. 30, 2021

(51) Int. Cl.
*G06T 11/20* (2006.01)
*G06T 11/60* (2006.01)

(52) U.S. Cl.
CPC ............ *G06T 11/203* (2013.01); *G06T 11/60* (2013.01)

(58) Field of Classification Search
CPC ................................ G06T 11/203; G06T 11/60
See application file for complete search history.

(56) References Cited

U.S. PATENT DOCUMENTS

| | | | | |
|---|---|---|---|---|
| 5,694,535 A | * | 12/1997 | Broekhuijsen | G06T 11/203 345/442 |
| 8,803,885 B1 | * | 8/2014 | Carron | G06F 3/0416 345/442 |
| 2011/0285722 A1 | * | 11/2011 | Kilgard | G06T 15/005 345/442 |
| 2013/0278594 A1 | * | 10/2013 | Kaatz | G06T 3/4007 345/419 |

OTHER PUBLICATIONS

Gerald E. Farin and Dianne Hansford. The Essentials of CAGD. A. K. Peters, Ltd., Natick, MA, USA, 1st edition, 2000.
J.A. Nelder and R.Mead. A Simplex Method for Function Minimization. The Computer Journal, 7(4):308-313, 01 1965.
Philip J. Schneider. Graphics gems, chapter An Algorithm for Automatically Fitting Digitized Curves, pp. 612-626. Academic Press Professional, Inc., San Diego, CA, USA, 1990.

* cited by examiner

*Primary Examiner* — Ryan R Yang
(74) *Attorney, Agent, or Firm* — Keller Jolley Preece

(57) ABSTRACT

The present disclosure relates to systems, methods, and non-transitory computer readable media for removing an anchor point from a Bezier spline while preserving the shape of the Bezier spline. For example, the disclosed systems can replace adjacent input segments of an initial Bezier spline that are connected at an anchor point with a new contiguous segment that does not include an anchor point and that spans the portion of the spline covered by the adjacent segments. The disclosed systems can utilize an objective function to determine tangent vectors that indicate locations of control points for generating the new segment to replace the adjacent segments. In addition, the disclosed systems can generate a modified Bezier spline that includes the new segment in place of the adjacent segments of the initial Bezier spline.

20 Claims, 12 Drawing Sheets

REMOVING ANCHOR POINTS FROM A PATH WHILE REDUCING DEVIATION OF THE PATH

BACKGROUND

In the field of digital design editing, designers want precise control over geometry of Bezier paths, including both the number and placement of anchor points along a spline as well as handle positions for the anchor points. To achieve the desired control, some digital design editing systems enable designers to manipulate anchor points through various operations. Many of these conventional digital design editing systems insert anchor points for finer control and flexibility over the geometry of the path.

Despite these advances however, conventional digital design editing systems continue to suffer from a number of disadvantages in accuracy and efficiency. For example, while some conventional digital design editing systems can remove anchor points from a Bezier spline, they often do so inaccurately. Indeed, these conventional digital design editing systems frequently alter the shape or geometry of the spline when removing an anchor point. These changes in shape are often significant and can result in splines that are unrecognizable in relation to the initial spline or otherwise incompatible with a particular intent of a designer.

As a contributing factor to the inaccurate shapes of resulting splines, conventional digital design editing systems often inaccurately place handles for manipulating anchor points of a Bezier spline when removing anchor points. Particularly, some of these conventional systems retain handle attributes on a spline even when an anchor point is removed, which can result in a curve that is drastically different in shape from the initial curve. Conversely, some conventional systems completely retract handles when removing an anchor point, thus giving the impression of a corner on a Bezier spline where no corner exists in the initial spline.

In an effort to resolve some of these inaccuracies, some conventional digital design editing systems discretize a Bezier spline by sampling the spline into discrete points. However, sampling connected Bezier segments into discrete points loses information that affects an overall shape or geometry of the entire Bezier spline. As a result, these systems often remove anchor points to generate a resultant spline that inaccurately resembles the initial spline. For many cases, especially where Bezier splines have inflection points, loops, and cusps, these conventional digital design editing systems generate unstable or inaccurate results by eliminating loops and cusps when removing anchor points because determining a nearest point or a nearest segment is not sensitive to placement on the fitted curve with respect to its parameterization.

Beyond being inaccurate, many conventional digital design editing systems are also inefficient. In particular, conventional systems require an excessive amount of computing resources such as processing power, processing time, and memory to process large numbers of user interactions. To elaborate, due at least in part to the inaccuracy of conventional digital design editing systems, these conventional systems further require onerous user interactions to edit Bezier splines by moving handles to fix the shape after removing an anchor point. Additionally, some conventional systems require computationally intensive operations to remove an anchor point, such as evaluating high-degree (e.g., fifth-degree) polynomial equations which takes a large amount of processing power and processing time.

Thus, there are several disadvantages with regard to conventional digital design editing systems.

SUMMARY

One or more embodiments described herein provide benefits and solve one or more of the foregoing or other problems in the art with systems, methods, and non-transitory computer readable media that can accurately and efficiently remove anchor points from a Bezier spline while preserving shape or geometry of the Bezier spline. In particular, the disclosed systems can reduce deviation from an initial Bezier spline when removing an anchor point by identifying two piecewise cubic Bezier segments on either side of the anchor point to be removed and generating a new Bezier curve to replace the two segments. More specifically, the disclosed systems can utilize an objective function to generate the new Bezier curve to replace the two segments by determining control points for the new Bezier curve. The disclosed systems can determine the control points by utilizing an objective function to determine tangent vector magnitudes that indicate the locations of the control points. Particularly, the disclosed systems can set up the objective function by dividing the two segments and the new segment in proportion to the lengths of the two segments. The disclosed systems can then uniformly subdivide the two segments and each piece of the current resulting segment uniformly based on length. The disclosed systems can then minimize the objective function to determine magnitudes of the tangent vectors that indicate locations of the control points of the new segment to replace the two segments.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
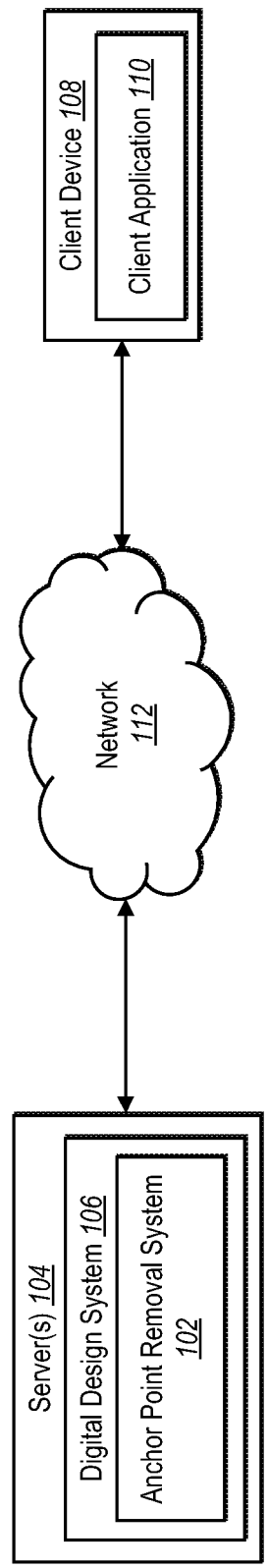
FIG. 1 illustrates an example system environment in which an anchor point removal system can operate in accordance with one or more embodiments.

One or more embodiments described herein include an anchor point removal system that can remove one or more anchor points from an initial Bezier spline to generate a modified Bezier spline while minimizing deviation from the initial Bezier spline. To remove an anchor point, the anchor point removal system can identify input Bezier segments that are adjacent to each other—i.e., that are connected at the anchor point to be removed. In addition, the anchor point removal system can generate a new Bezier segment to replace the two input Bezier segments by utilizing an objective function. For instance, the anchor point removal system can utilize the objective function to generate tangent vectors that indicate locations of control points for the new Bezier segment. To elaborate, the anchor point removal system can determine directions of the tangent vectors based on directions of corresponding tangent vectors of the input Bezier segments. In addition, the anchor point removal system can determine the magnitudes of the tangent vectors by minimizing (or otherwise utilizing) an objective function. Upon determining the directions and magnitudes of the tangent vectors, the anchor point removal system can generate the new Bezier segment defined (in part) by the control points indicated by the tangent vectors.

To set up the objective function for determining the magnitudes of tangent vectors, the anchor point removal system can divide the new Bezier segment into smaller portions (e.g., sub-segments) based on lengths of the two input Bezier segments. In addition, the anchor point removal system can subdivide the smaller portions lengthwise into still smaller portions in a uniform manner. Based on these subdivided portions, the anchor point removal system can determine a shape of the new Bezier segment based on the (combined) shapes of the two input Bezier segments. The anchor point removal system can also apply the objective function over the subdivided portions to determine magnitudes of the tangent vectors to thereby determine locations of control points defining the new Bezier segment.

In some embodiments, the anchor point removal system removes multiple anchor points together by identifying anchor points along a Bezier spline and automatically (e.g., without user input) selecting a number of the anchor points to remove in accordance with subdividing a resulting Bezier curve (e.g., a Bezier curve to replace one or more input Bezier segments) lengthwise in proportion to lengths of the input Bezier segments.

As mentioned, the anchor point removal system can remove an anchor point from an initial Bezier spline. In particular, the anchor point removal system can identify two adjacent Bezier segments that are separated by, or connected at, the anchor point to be removed. In addition, the anchor point removal system can generate a modified Bezier spline by replacing the two adjacent segments with a new segment that spans the length of the two adjacent segments combined and that retains the shape or path of (or reduces the deviation from) the two adjacent segments.

To generate the new segment that reduces deviation from the two adjacent segments, the anchor point removal system can determine control points for the new segment based on the control points of the two adjacent segments. Specifically, the anchor point removal system can determine control points for the two adjacent segments and can utilize these control points to determine control points for a new segment to replace the two adjacent segments.

To elaborate, the anchor point removal system can determine a first control point (e.g., an endpoint) for the new segment at an endpoint of the first adjacent segment. Likewise, the anchor point removal system can determine a final control point (e.g., another endpoint at the opposite endpoint of the new segment) at an endpoint of the second adjacent segment. In this manner, the anchor point removal system generates the new segment to begin where the first adjacent segment begins and to end where the second adjacent segment ends.

Additionally, the anchor point removal system can determine additional control points (e.g., middle points) between the two endpoints—i.e., between the first control points and the final control point. The anchor point removal system can determine such additional control points for the new segment based on tangent vectors of the two adjacent segments. To determine positions or locations for the additional control points, the anchor point removal system can determine tangent vectors to point to or otherwise indicate the positions for the additional control points (i.e., the middle points). Indeed, the anchor point removal system can determine tangent vectors for the new segment based on tangent vectors associated with the first adjacent segment and the second adjacent segment.

As mentioned, the anchor point removal system can determine tangent vectors for a new Bezier segment based on tangent vectors for adjacent Bezier segments that are to be replaced. For instance, to preserve the shape of the initial Bezier spline, the anchor point removal system can determine that a direction of a first tangent vector for the new segment (e.g., a tangent vector originating at the first endpoint for the new segment) is in the same direction as a tangent vector for the first adjacent segment (e.g., a tangent vector from the first control point of the first adjacent segment to a second control point of the first adjacent segment). In some embodiments, the anchor point removal system further determines that a direction of a second tangent vector for the new segment (e.g., a tangent vector terminating at the second endpoint for the new segment) is in the same direction as a tangent vector for the second adjacent segment (e.g., a tangent vector from a third control point of the second adjacent segment to a fourth control point or an endpoint of the second adjacent segment).

In addition to determining directions for tangent vectors, the anchor point removal system can determine magnitudes for the tangent vectors (e.g., the first tangent vector and the second tangent vector) that reduce or minimize the deviation between the new segment and the two adjacent segments (e.g., a combination of the new adjacent segments). To this end, the anchor point removal system can utilize an objective function to sample the new segment at various sample positions and to determine magnitudes of the tangent vectors from the endpoints to the additional control points (e.g., the middle points). Specifically, the anchor point removal system can utilize the objective function to determine magnitudes for tangent vectors by parameterizing the new segment and determining parametric values at lengthwise subdivisions along the new segment.

Indeed, the anchor point removal system can divide the new segment proportionally to lengths of the two adjacent segments to determine and/or utilize an objective function that accounts for discrepancies between parametric space and Euclidean space. To identify sample positions in Euclidean space, the anchor point removal system can determine and/or utilize an objective function that accounts for curvatures and lengths of the adjacent segments. The anchor point removal system thus samples the new segment based on the respective lengths of the first adjacent segment and the second adjacent segment. Indeed, the anchor point removal system subdivides the new segment and the adjacent segments into length-based subdivisions at sample positions along a first portion of the new segment spaced proportionally to the length of the first adjacent segments and along a second portion of the new segment space proportionally to the length of the second adjacent segment. More particularly, the anchor point removal system subdivides the segments such that a length proportion of subdivisions is the same in the original adjacent segments and the new segment (e.g., a length of a subdivision from one of adjacent segments/total length of both adjacent segments equals a length of a corresponding subdivision from the new segment/total length of new segment). Indeed, the anchor point removal system can determine a number of subdivisions for sample positions of the objective function based on the curvatures and lengths of the two adjacent input segments. The anchor point removal system can further optimize (i.e., apply or minimize an objective function) over a combination of the subdivided portions of the new segment to determine the magnitudes of the tangent vectors and to determine the parametric value (and the corresponding Euclidean position) for the anchor point to be removed.

In one or more embodiments, the anchor point removal system automatically removes multiple anchor points from a Bezier spline. To elaborate, the anchor point removal system can determine a parametric value corresponding to a position of an anchor point to be removed and can repeat the process to automatically (e.g., without user input indicating anchor points to remove) identify and remove anchor points along a Bezier spline. To determine the parametric values, the anchor point removal system can sample along an additional Bezier spline at increments corresponding to a number of segments between the various anchor points to remove from the initial Bezier spline.

The anchor point removal system can provide several advantages over conventional digital design editing systems. For example, the anchor point removal system is more accurate than conventional systems. In particular, the anchor point removal system can remove one or more anchor points from a Bezier spline while reducing or minimizing a deviation. Indeed, as opposed to many conventional systems that significantly alter the shape or geometry of a Bezier spline when removing anchor points, the anchor point removal system can preserve the shape of the Bezier spline by utilizing a particular objective function that is based on subdividing portions of the Bezier spline proportionally to lengths of input segments.

As another example of the improved accuracy of the anchor point removal system, the anchor point removal system can modify handle positions of the Bezier spline upon removal of an anchor point. Thus, unlike conventional systems that retain handle attributes event when an anchor point is removed (thus resulting in a curve that is drastically different in shape than an initial curve), the anchor point removal system can modify handle attributes to preserve the shape of the initial curve. In contrast to other conventional systems that completely retract handles when removing an anchor point, the anchor point removal system can retain handles at particular positions (even where anchor points are removed), thus preventing the appearance of corners where no corners exist in the initial spline.

Further relating to the improved accuracy of the anchor point removal system, the anchor point removal system can preserve the shape of inflection points, loops, and cusps along an initial Bezier spline. Whereas some conventional digital design editing systems sample a spline into discrete points (thereby losing information for the shape of the spline and resulting unstable results), the anchor point removal system utilizes an objective function based on lengthwise proportional subdivisions of a Bezier spline, which can help to preserve the overall shape of the initial Bezier spline. The anchor point removal system can thus provide more stable results by preserving inflection points, loops, and cusps that exist in an initial spline.

In addition to improving accuracy, the anchor point removal system is also more efficient than conventional digital design editing systems. For example, the anchor point removal system can utilize fewer computing resources such as processing power, processing time and memory to process user interactions. Compared to conventional systems that, due to their inaccuracy, have to process large numbers of user interactions to modify shapes of Bezier splines after removing anchor points, the anchor point removal system processes far fewer user interactions. Indeed, because the anchor point removal system can generate more accurate modified Bezier splines when removing anchor points, the anchor point removal system reduces or eliminates the need for users to modify the resulting splines after the fact.

Further, the anchor point removal system can utilize a more efficient operation than many conventional digital design editing systems. In particular, while many conventional systems require computationally intensive operations such as evaluating high-degree polynomial equations (multiple times for each anchor point to be removed), the anchor point removal system can utilize more efficient operations that are less computationally intensive. For example, the anchor point removal system can utilize an objective function of a lower-degree and/or can apply the objective function fewer times for each anchor point to be removed.

As illustrated by the foregoing discussion, the present disclosure utilizes a variety of terms to describe features and benefits of the anchor point removal system. Additional detail is hereafter provided regarding the meaning of these terms as used in this disclosure. In particular, the term "anchor point" refers to a point along a Bezier spline that that is manipulable via a handle to change the position of the anchor point and the corresponding shape of the Bezier spline. In some embodiments, an anchor point is selectable and moveable to change the shape of the Bezier spline. An anchor point can coincide with a control point of a Bezier spline, but an anchor point is not necessarily the same as a control point.

Relatedly, the term "Bezier spline" (or simply "spline") refers to a parametric path that spans between anchor points.

In particular, a Bezier spline can refer to a parametric path that is related to the Bernstein polynomial and that is defined by a set of control points, where the first and last control points are the endpoints of the Bezier spline and where the curvature of the Bezier spline is based on tangent vectors of the control points. In some embodiments, a Bezier spline can include a parametric curve or segment or a combination of multiple parametric curves or segments. A Bezier spline is manipulable (i.e., can be modified) via anchor points and/or handles to change positions of anchor points and/or curvature of the Bezier spline to thereby modify the shape or geometry of the Bezier spline.

As mentioned, the anchor point removal system can modify an initial Bezier spline. Thus, an "initial Bezier spline" (or simply "initial spline") refers to a Bezier spline that is not yet modified—i.e., a Bezier spline that includes all initial anchor points and has not yet had any anchor points removed. Conversely, a "modified Bezier spline" (or simply "modified spline") refers to a Bezier spline that has been changed from the initial Bezier spline. For example, a modified Bezier spline refers to a Bezier spline that has had one or more anchor points removed.

As mentioned, a Bezier spline can be made up of one or more Bezier segments. As used herein, the term "Bezier segment" (or simply "segment") refers to a parametric segment of a Bezier spline that spans between two consecutive or successive anchor points. Indeed, a Bezier segment can refer to a contingent segment of a Bezier spline, where the Bezier segment connects to two anchor points—one anchor point at one end and another anchor point at the other end. In one or more embodiments, the term Bezier segment is synonymous with the term Bezier curve. In some embodiments, the anchor point removal system identifies "adjacent segments" which are segments that share an anchor point—i.e., segments that are connected or joined at an anchor point between them.

As used herein, the term "control point" refers to a point that defines a position and/or a geometry of at least a portion of a Bezier spline or a Bezier segment. A control point can refer to an endpoint that defines the beginning or the end of a Bezier spline or a Bezier segment. A control point can also refer to a middle point that may or may not fall directly on a Bezier spline or a Bezier segment but whose relationship with other control points (e.g., the endpoints) defines the shape or the geometry of the resulting Bezier spline or Bezier segment. Indeed, a Bezier segment can include "endpoints" defining the ends of the Bezier segment. A Bezier segment can further include "middle points" defining control points other than the endpoints and whose position (on or off of the Bezier segment) relative to the endpoints dictates the shape of the Bezier segment.

Additional detail regarding the anchor point removal system will now be provided with reference to the figures. For example, FIG. 1 illustrates a schematic diagram of an example system environment for implementing an anchor point removal system 102 in accordance with one or more embodiments. An overview of the anchor point removal system 102 is described in relation to FIG. 1. Thereafter, a more detailed description of the components and processes of the anchor point removal system 102 is provided in relation to the subsequent figures.

As shown, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 11.

As mentioned, the environment includes a client device 108. The client device 108 can be one of a variety of computing devices, including a smartphone, a tablet, a smart television, a desktop computer, a laptop computer, a virtual reality device, an augmented reality device, or another computing device as described in relation to FIG. 11. Although FIG. 1 illustrates a single client device 108, in some embodiments the environment can include multiple different client devices, each associated with a different user. The client device 108 can communicate with the server(s) 104 via the network 112. For example, the client device 108 can receive user input from a user interacting with the client device 108 (e.g., via the client application 110) to, for example, select an anchor point, manipulate a handle of an anchor point, relocate an anchor point, or remove an anchor point. Thus, the anchor point removal system 102 on the server(s) 104 can receive information or instructions to generate a modified Bezier spline and/or to render changes or modifications to a Bezier spline (e.g., by generating a modified Bezier spline) based on the input received by the client device 108.

As shown, the client device 108 includes a client application 110. In particular, the client application 110 may be a web application, a native application installed on the client device 108 (e.g., a mobile application, a desktop application, etc.), or a cloud-based application where all or part of the functionality is performed by the server(s) 104. The client application 110 can present or display information to a user, including a user interface for editing, manipulating, creating, or otherwise interacting with a Bezier spline. Additionally, the client application 110 can present interactive elements in the form of handles or selectable anchor points to interact with the Bezier spline. A user can interact with the client application 110 to provide user input to perform an operation as mentioned above, such as moving an anchor point or deleting an anchor point.

As illustrated in FIG. 1, the environment includes the server(s) 104. The server(s) 104 may generate, track, store, process, receive, and transmit electronic data, such as user interactions to manipulate anchor points or remove anchor points. For example, the server(s) 104 may receive data from the client device 108 in the form of a request to remove an anchor point. In addition, the server(s) 104 can transmit data to the client device 108 to provide a modified Bezier spline with the anchor point removed. Indeed, the server(s) 104 can communicate with the client device 108 to transmit and/or receive data via the network 112. In some embodiments, the server(s) 104 comprises a distributed server where the server(s) 104 includes a number of server devices distributed across the network 112 and located in different physical locations. The server(s) 104 can comprise a content server, an application server, a communication server, a web-hosting server, or a machine learning server.

As shown in FIG. 1, the server(s) 104 can also include the anchor point removal system 102 as part of a digital design system 106. The digital design system 106 can communicate with the client device 108 to perform various functions associated with the client application 110 such as adding or removing an anchor point from a Bezier spline. In addition, the digital design system 106 and/or the anchor point removal system 102 can remove anchor points from a Bezier spline based on sampling the Bezier spline proportionally to lengths of segments on either side of an anchor point to be removed.

Although FIG. 1 depicts the anchor point removal system 102 located on the server(s) 104, in some embodiments, the anchor point removal system 102 may be implemented by (e.g., located entirely or in part) on one or more other components of the environment. For example, the anchor point removal system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the anchor point removal system 102, bypassing the network 112. In addition, the environment can include a database located external to the server(s) 104 (e.g., in communication via the network 112) or located on the server(s) 104 and/or on the client device 108. For example, the anchor point removal system 102 can store information for a Bezier spline within the database such as curvature information, control point information (e.g., locations of control points), length information, locations or positions of anchor points.

Figure 2:
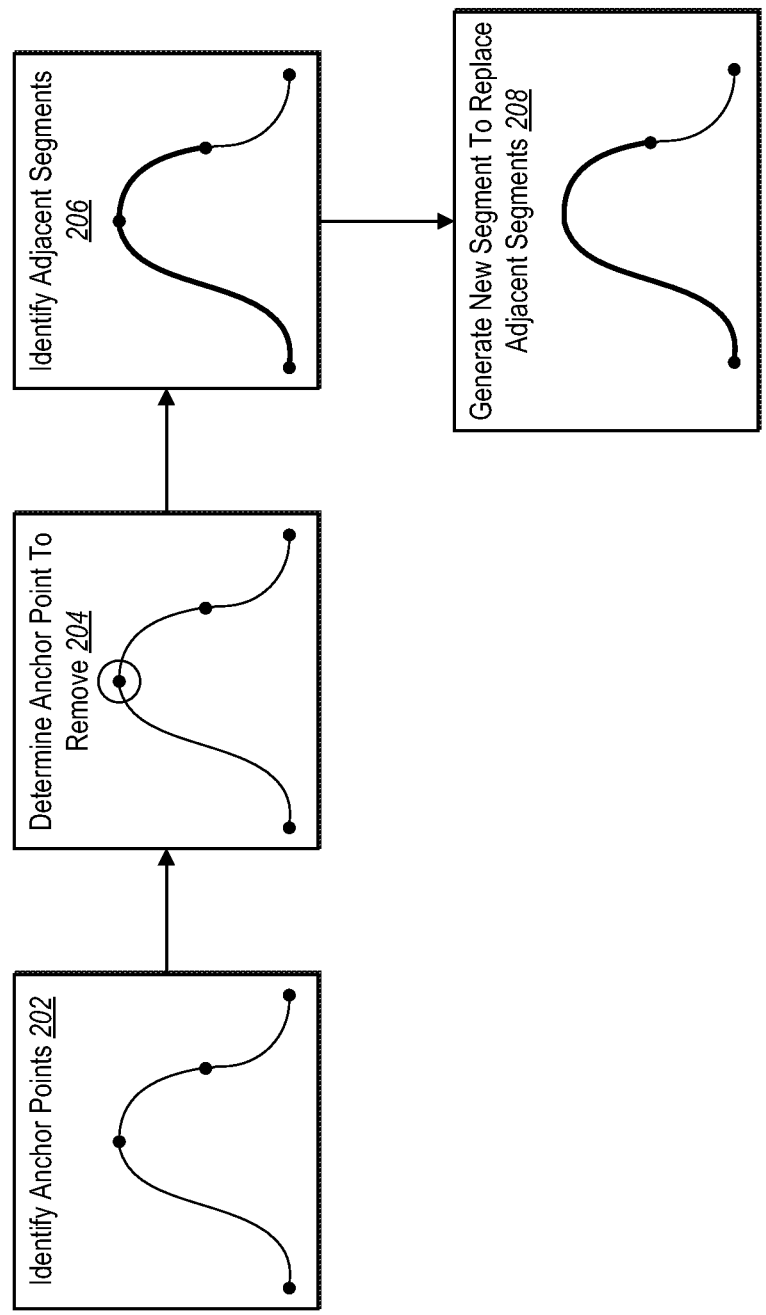
FIG. 2 illustrates a sequence of acts in a process of generating a new segment in accordance with one or more embodiments.

As mentioned, the anchor point removal system 102 can remove an anchor point from a Bezier spline while preserving the shape of the Bezier spline. In particular, the anchor point removal system 102 can generate a modified Bezier spline with the anchor point removed, where the modified Bezier spline has a reduced (or minimized) deviation from the initial Bezier spline. FIG. 2 illustrates an example sequence of acts for removing an anchor point from a Bezier spline while preserving the shape of the Bezier spline in accordance with one or more embodiments.

As illustrated in FIG. 2, the anchor point removal system 102 performs an act 202 to identify anchor points. In particular, the anchor point removal system 102 identifies a plurality of anchor points along an initial Bezier spline. Indeed, the anchor point removal system 102 determines locations or positions for the anchor points. For example, the anchor point removal system 102 automatically generates anchor points for an initial Bezier spline or receives user input to generate anchor points at particular locations for an initial Bezier spline. As illustrated in FIG. 2, the Bezier spline includes four anchor points (as indicated with dots in FIG. 2) at various locations.

As further illustrated in FIG. 2, the anchor point removal system 102 performs an act 204 to determine an anchor point to remove. Particularly, the anchor point removal system 102 receives a user interaction to indicate one or more anchor points to remove. In some embodiments, the anchor point removal system 102 automatically determines to remove a particular anchor point without user input. In some embodiments, the anchor point removal system 102 receives an indication from the client device 108 that a user selects the circled anchor point (e.g., within an anchor point removal interface of the client application 110) to remove from the Bezier spline.

Based on determining the anchor point to remove, the anchor point removal system 102 performs an act 206 to identify adjacent segments corresponding to the anchor point to remove. More specifically, the anchor point removal system 102 identifies a first adjacent segment and a second adjacent segment connected at the anchor point to be removed.

For example, the anchor point removal system 102 identifies the first adjacent segment as a segment to the left of the anchor point to be removed. The anchor point removal system 102 identifies the first adjacent segment spanning from the anchor point to be removed to the next anchor point out in a leftward direction from the anchor point to be removed. Similarly, the anchor point removal system 102 identifies a second adjacent segment as a segment to the right of the anchor point to be removed. The anchor point removal system identifies the second adjacent segment spanning from the anchor point to be removed to the next anchor point out in a rightward direction from the anchor point to be removed.

As further illustrated in FIG. 2, the anchor point removal system 102 performs an act 208 to generate a new segment to replace the adjacent segments. Indeed, the anchor point removal system 102 generates a modified Bezier spline by replacing the two adjacent segments (that are separated by the anchor point to be removed) with a new segment that spans the portion of the initial Bezier spline initially covered by the two adjacent segments. For instance, the anchor point removal system 102 generates the new segment to span from the next anchor point to the left of the anchor point to be removed to the next anchor point to the right of the anchor point to be removed.

To generate the new segment, the anchor point removal system 102 determines control points that define the new segment. Specifically, the anchor point removal system 102 determines control points of the two adjacent segments and utilizes these control points as a basis for determining control points of the new segment to replace the two adjacent segments. For example, the anchor point removal system 102 determines a first control point at an endpoint of the a first adjacent segment and determines a second (or last) control point at an endpoint of a second adjacent segment opposite the endpoint of the first adjacent segment. To determine additional control points, the anchor point removal system 102 samples the new segment proportionally to the lengths of the two adjacent segments and utilizes an objective function to determine tangent vectors indicating locations of the additional control points for the new segment (relative to the positions of the first and second control points).

Indeed, the anchor point removal system 102 determines a first direction between a first control point (e.g., an endpoint) of a first adjacent segment and a second control point (e.g., a middle point) of the first adjacent segment. In addition, the anchor point removal system 102 determines a second direction between a last control point (e.g., a fourth control point or an endpoint) of a second adjacent segment and a third control point (e.g., a middle point) of the second adjacent segment. The anchor point removal system 102 further determines a direction of a first tangent vector from an endpoint of the new segment to match the first direction and a direction of a second tangent vector from an opposite endpoint of the new segment to match the second direction.

In addition, the anchor point removal system 102 samples a first portion of the new segment proportionally to the length of the first adjacent segment and samples a second portion of the new segment proportionally to the length of the second adjacent segment. The anchor point removal system 102 further implements (e.g., minimizes) an objective function to determine magnitudes of the tangent vectors for determining locations of the additional control points (e.g., the middle points). Additional detail regarding generating the new segment to replace the two adjacent segments is provided below with reference to subsequent figures.

Figure 3A:
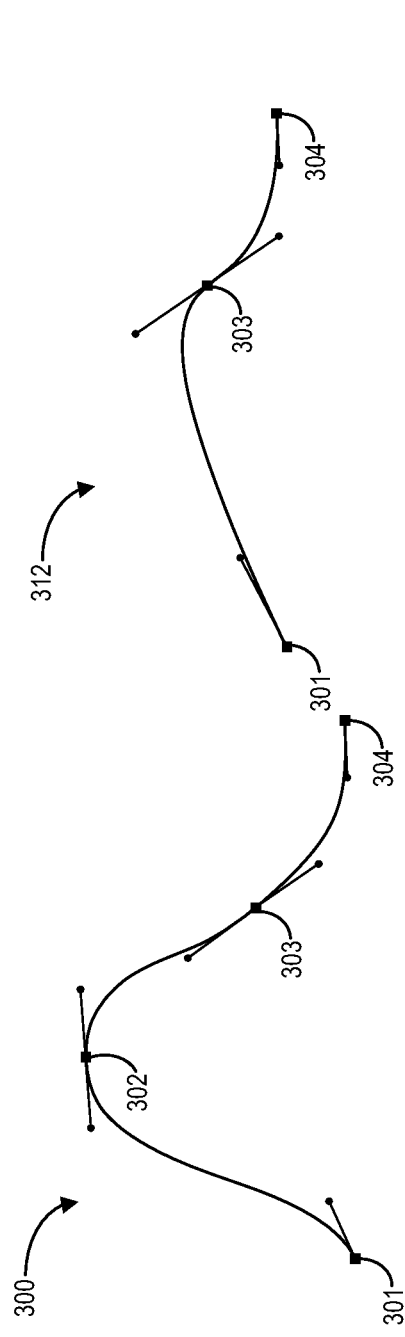
FIG. 3A illustrates a collapsed Bezier spline generated by a conventional digital design editing system in accordance with one or more embodiments.

As mentioned, the anchor point removal system 102 can generate more accurate modified Bezier splines when removing anchor points, as compared to conventional digital design editing systems. In particular, the anchor point removal system 102 can generate a modified Bezier spline that reduces or minimizes deviation from an initial Bezier spline. FIG. 3A illustrates a collapsed Bezier spline 312 generated from an initial Bezier spline 300 by a conventional digital design editing system in accordance with one or more embodiments. Thereafter, FIG. 3B illustrates improvements in accuracy of the anchor point removal system 102 by depicting a modified (e.g., preserved) Bezier spline 314 generated from the initial Bezier spline 300 by the anchor point removal system 102 in accordance with one or more embodiments.

As illustrated in FIG. 3A, the initial Bezier spline 300 includes anchor points 301-304. A conventional digital design editing system removes the anchor point 302 from the initial Bezier spline 300 to generate the collapsed Bezier spline 312. For example, the conventional system receives a user input selecting the anchor point 302 to remove from the initial Bezier spline 300. In response to the input, the conventional system removes the anchor point 302. While the conventional system does remove the anchor point 302 from the initial Bezier spline 300 in generating the collapsed Bezier spline 312, the conventional system nevertheless generates the collapsed Bezier spline 312 that does not resemble or maintain a shape of the initial Bezier spline 300. Indeed, in removing the anchor point 302, the conventional system is unable to retain the geometry of the initial Bezier spline 300 and therefore generates the collapsed Bezier spline 312 that differs significantly in appearance from the initial Bezier spline.

Figure 3B:
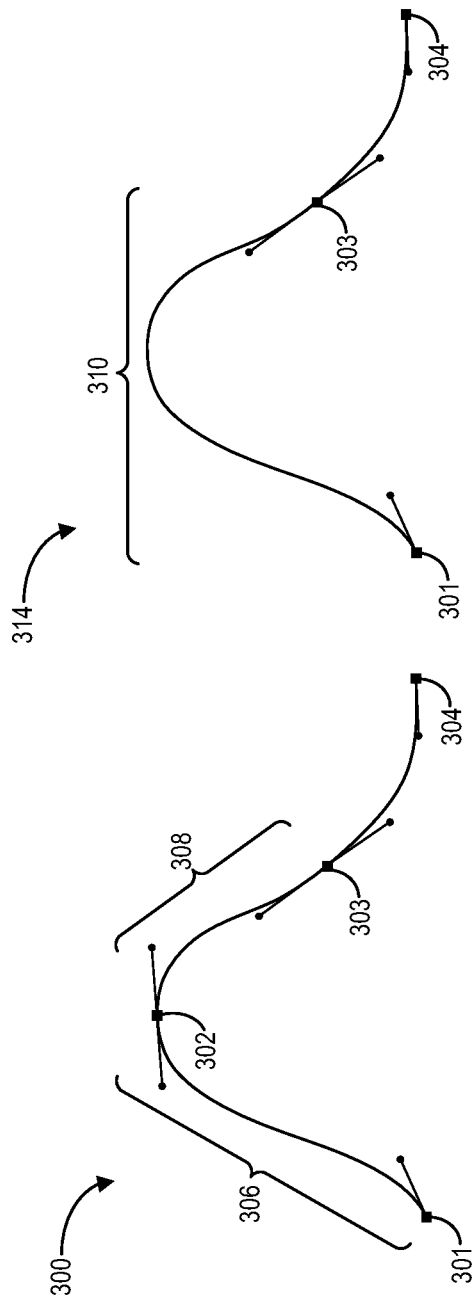
FIG. 3B illustrates a more accurate modified Bezier spline generated by the anchor point removal system in accordance with one or more embodiments.

As illustrated in FIG. 3B, by contrast, the anchor point removal system 102 generates the modified Bezier spline 314 by removing the anchor point 302 while still preserving the shape of the initial Bezier spline 300. For example, the anchor point removal system 102 removes the anchor point 302 from between the anchor point 301 and the anchor point 303 without (drastically) changing the shape of the segment(s) therebetween. Indeed, the anchor point removal system 102 exhibits improved accuracy and stability over the conventional system of FIG. 3A by generating the modified Bezier spline 314 that closely resembles (or matches) the initial Bezier spline 300. In particular, the anchor point removal system 102 removes the anchor point 302, but rather than collapsing the spline like the conventional system, the anchor point removal system 102 utilizes particular techniques to preserve the shape of the initial Bezier spline 300.

Figure 4A:
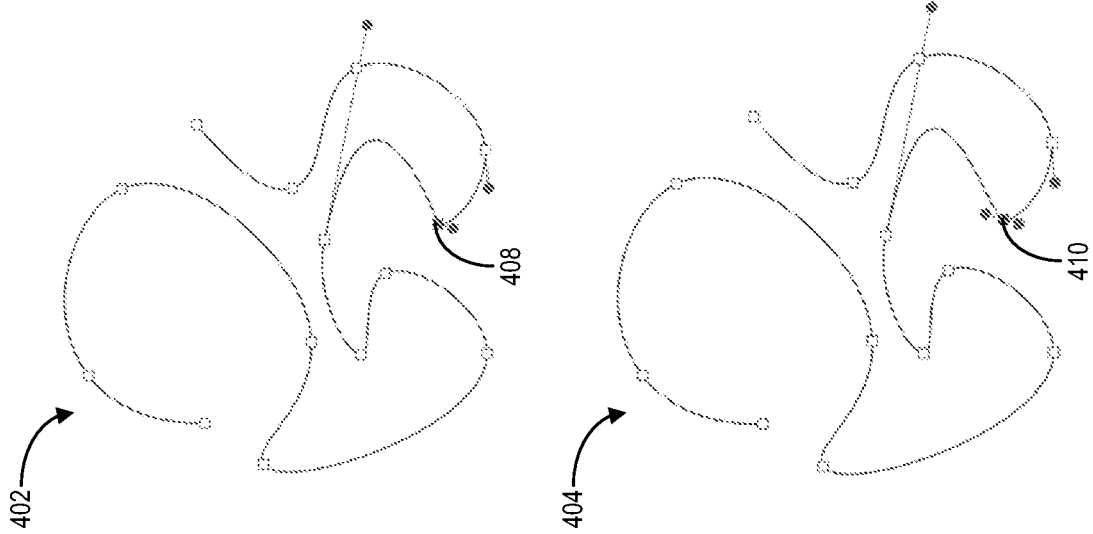
FIG. 4A illustrates a cornered Bezier spline generated by a conventional digital design editing system in accordance with one or more embodiments.

As a further example of improvements of the anchor point removal system 102 over conventional digital design editing systems, the anchor point removal system 102 can remove an anchor point without creating corners. In particular, when removing anchor points, some conventional systems create corners (or at least give the appearance of corners) in splines where no corner exists in the initial spline. FIG. 4A illustrates the results of a conventional digital design editing system that generates the cornered Bezier spline 402 from the initial Bezier spline 400 in accordance with one or more embodiments. Thereafter, FIG. 4B illustrates how the anchor point removal system 102 generates the modified Bezier spline 404 from the initial Bezier spline 400 in accordance with one or more embodiments.

As illustrated in FIG. 4A, the conventional system removes the anchor point 406 from the initial Bezier spline 400 to generate the cornered Bezier spline 402. The cornered Bezier spline 402 includes a corner in a location where no corner exists in the initial Bezier spline 400. Indeed, as shown, the cornered Bezier spline 402 generates a one-sided handle 408 at the illustrated location, which gives a user the impression of a corner at the location where no such corner exists in the initial Bezier spline 400. Thus, the conventional system generates the cornered Bezier spline 402 as an inaccurate resemblance of the initial Bezier spline 400.

Figure 4B:
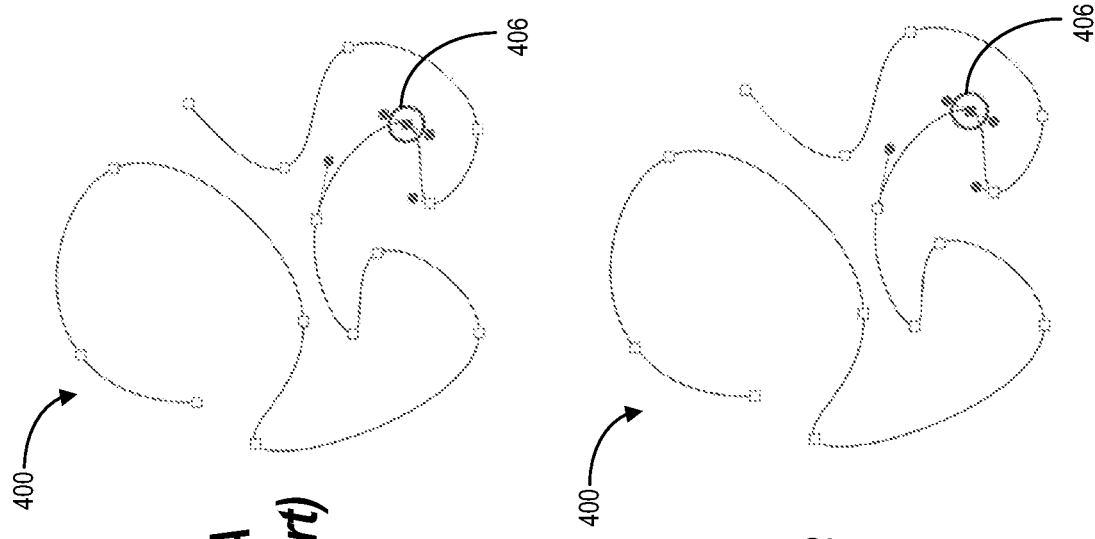
FIG. 4B illustrates a more accurate modified Bezier spline generated by the anchor point removal system in accordance with one or more embodiments.

As shown in FIG. 4B, the anchor point removal system 102 identifies the anchor point 406 to remove from the initial Bezier spline 400. Indeed, the anchor point removal system 102 removes the anchor point 406 to generate the modified Bezier spline 404 that more closely resembles the initial Bezier spline 400, as compared to the conventional system of FIG. 4A. For example, the anchor point removal system 102 generates the modified Bezier spline 404 to include a two-sided handle 410 that does not give a user the impression of a corner at the handle location. Thus, the anchor point removal system 102 generates the modified Bezier spline 404 that reduces deviation from the initial Bezier spline 400.

Figure 5:
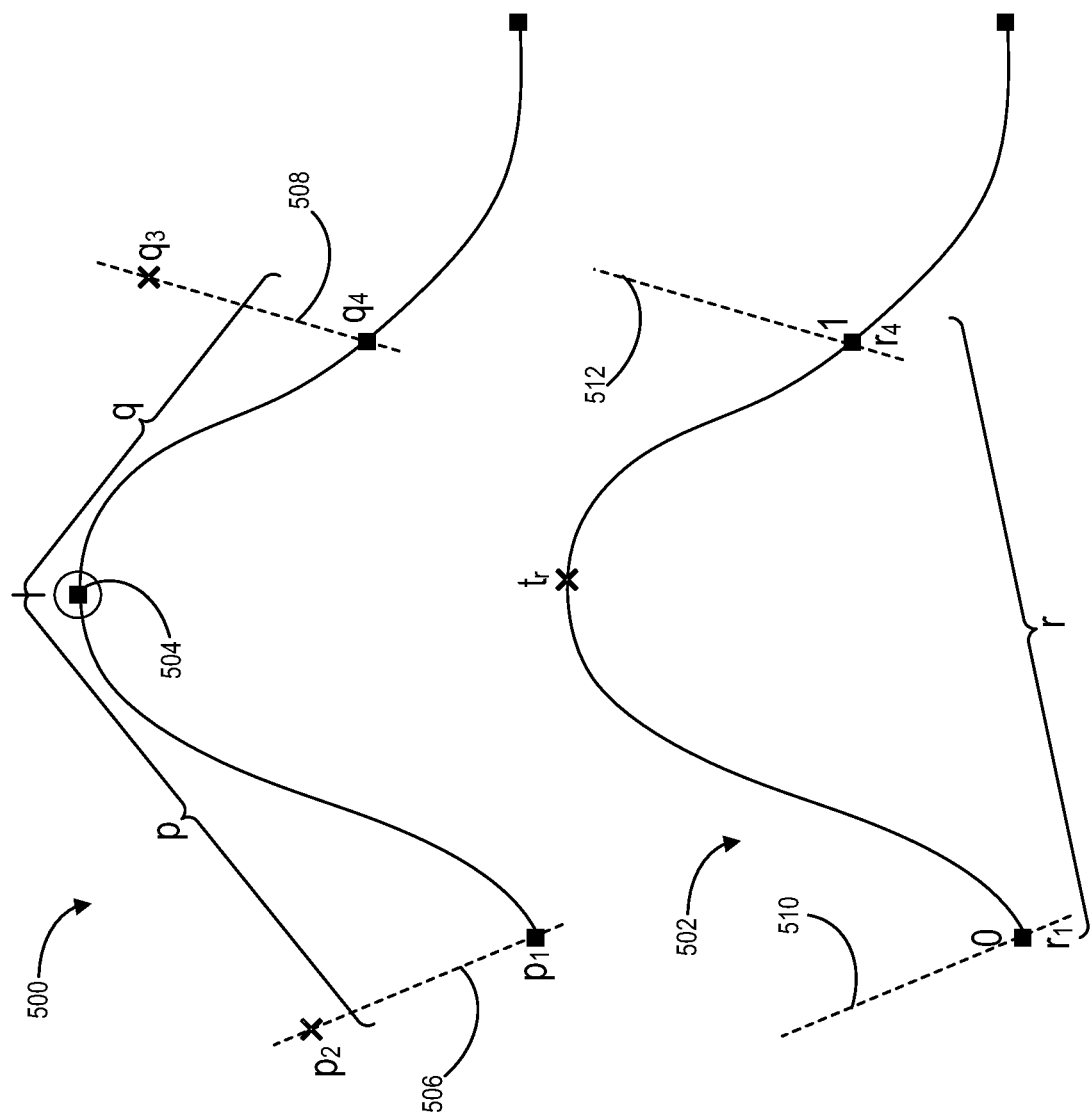
FIG. 5 illustrates generating a new segment to replace adjacent input segments of an initial spline in accordance with one or more embodiments.

To generate a modified Bezier spline (e.g., the modified Bezier spline 404 or 314) that closely resembles a corresponding initial Bezier spline, the anchor point removal system 102 can utilize a parameterization technique. In particular, the anchor point removal system 102 can parameterize control points of segments of an initial Bezier spline as well as those of a new segment. In addition, the anchor point removal system 102 can sample the new segment at sample positions spaced proportionally to lengths of segments of the initial spline to be replaced. FIG. 5 illustrates generating a modified Bezier spline 502 from an initial Bezier spline 500 in accordance with one or more embodiments.

As illustrated in FIG. 5, the anchor point removal system 102 identifies a number of anchor points along the initial Bezier spline (e.g., the four anchor points designated by squares along the spline). In addition, the anchor point removal system 102 determines to remove the anchor point 504. In particular, the anchor point removal system 102 receives an indication from the client device 108 to remove the anchor point 504 such as a click or a touch gesture and/or a selection of a delete option.

Based on determining to remove the anchor point 504, the anchor point removal system 102 identifies two adjacent input segments p and q that are connected at the anchor point 504. Based on the two adjacent input segments p and q, the anchor point removal system 102 generates a new segment r. Indeed, the anchor point removal system 102 generates the new segment r to replace the two adjacent input segments p and q.

To elaborate, the anchor point removal system 102 determines the input for generating the new segment r as the two piecewise cubic Bezier segments p and q (which are adjacent). The anchor point removal system 102 further parameterizes the adjacent input segments p and q in $\mathbb{R}^2$ by $t \in [0,1]$. In some embodiments, the anchor point removal system 102 generates parameterized input segments as given by:

$$p=(p_1,p_2,p_3,p_4)^T \text{ and}$$

$$q=(q_1,q_2,q_3,q_4)^T$$

where $p, q \in \mathbb{R}^8$, and where $p_1$-$p_4$ represent four control points for the input adjacent segment p and $q_1$-$q_4$ represent four control points for the input adjacent segment q. Indeed, $p_1$ and $p_4$ represent endpoints of the first adjacent input segment p, and $q_1$ and $q_4$ represent endpoints of the second adjacent input segment q. Additionally, $p_2$ and $p_3$ represent middle points of the first adjacent input segment, and $q_2$ and $q_3$ represent middle points of the second adjacent input segment.

In addition, the anchor point removal system 102 parameterizes the new segment r in accordance with:

$$r = (r_1, r_2, r_3, r_4)^T$$

where $r \in \mathbb{R}^8$, and where $r_1$-$r_4$ represent four control points of the new segment r. Thus, $r_1$ and $r_4$ represent endpoints of the new segment r, and $r_2$ and $r_3$ represent middle points of the new segment r. By parameterizing the segments in this way, the anchor point removal system 102 defines a span for new segment r to replace the two adjacent input segments p and q.

In some embodiments, the anchor point removal system 102 determines that the new segment r begins where first adjacent segment p begins (i.e., $r_1 = p_1$) and ends where the second adjacent segment ends (i.e., $r_4 = q_4$). In addition, the anchor point removal system 102 determines that the new segment r has the same tangent vector direction as p at t=0 and the same tangent vector direction as q at t=1. More specifically, the anchor point removal system 102 determines the tangent vector directions at $r_1$ and $r_4$ for the new segment r based on the tangent vector directions at $p_1$ and $q_4$ for the two adjacent input segments p and q. Indeed, the anchor point removal system 102 determines tangent vector magnitudes that indicate locations of the middle points $r_2$ and $r_3$ for the new segment r. Additional detail regarding sampling and determining tangent vector magnitudes for the new segment r is provided below with reference to FIG. 7.

From the control points of adjacent input segments p and q illustrated in FIG. 5, the anchor point removal system 102 determines directions of tangent vectors for the new segment r. In particular, the anchor point removal system 102 determines the direction of the tangent vector 506 of the first adjacent segment p. In addition, the anchor point removal system 102 determines that the direction of the tangent vector 506 is the same as the direction for a corresponding tangent vector 510 of the new segment r. More specifically, the anchor point removal system 102 determines the direction for the tangent vector 510 in accordance with:

$$\frac{r_2 - r_1}{\|r_2 - r_1\|} = \frac{p_2 - p_1}{\|p_2 - p_1\|}$$

where $$\frac{r_2 - r_1}{\|r_2 - r_1\|}$$

is the direction of the tangent vector 510 and $$\frac{p_2 - p_1}{\|p_2 - p_1\|}$$

is the direction of the tangent vector 506.

In a similar fashion, the anchor point removal system 102 determines the direction of the tangent vector 508 of the second adjacent segment q. Particularly, the anchor point removal system 102 determines that the direction of the tangent vector 508 is the same as the direction for a corresponding tangent vector 512 of the new segment r. Specifically, the anchor point removal system 102 determines the direction for the tangent vector 512 in accordance with:

$$\frac{r_3 - r_4}{\|r_3 - r_4\|} = \frac{q_3 - q_4}{\|q_3 - q_4\|}$$

where $$\frac{r_3 - r_4}{\|r_3 - r_4\|}$$

is the direction of the tangent vector 512 and $$\frac{q_3 - q_4}{\|q_3 - q_4\|}$$

is the direction of the tangent vector 508.

The anchor point removal system 102 utilizes the directions of the tangent vectors 510 and 512 to determine additional control points (e.g., middle points) for the new segment r. Indeed, the anchor point removal system 102 projects a location for a middle point $r_2$ from the endpoint $r_1$ in the direction given by the tangent vector 510. Particularly, the anchor point removal system 102 determines the position or location for the middle point $r_2$ given by:

$$r_2 = r_1 + \alpha * v_1$$

where $$v_1 = \frac{p_2 - p_1}{\|p_2 - p_1\|}$$

and $\alpha$ is the magnitude of the tangent vector 510.

Similarly, the anchor point removal system 102 projects a location for a middle point $r_3$ from the endpoint $r_4$ in the direction given by the tangent vector 512. More specifically, the anchor point removal system 102 determines the position or location for the middle point $r_3$ given by:

$$r_3 = r_4 + \beta * v_2$$

where $$v_2 = \frac{q_3 - q_4}{\|q_3 - q_4\|}$$

and $\beta$ is the magnitude of the tangent vector 512.

To reduce or minimize deviation of the new segment r from a combination of the two adjacent input segments p and q (which results in more recognizable curves as compared to conventional systems), the anchor point removal system 102 further determines the magnitudes of the tangent vectors 510 and 512 to determine locations of the middle points $r_2$ and $r_3$. In particular, the anchor point removal system 102 determines the values of $\alpha$ and $\beta$ to reduce or minimize the deviation of the new segment r with respect to the adjacent input segments p and q. By determining the magnitudes $\alpha$ and $\beta$, the anchor point removal system 102 thus determines the locations of the middle points $r_2$ and $r_3$ that result in a new segment r that closely resembles the shape or geometry of the adjacent input segments p and q.

In some embodiments, the anchor point removal system 102 determines the magnitudes $\alpha$ and $\beta$ by utilizing (e.g., minimizing) an objective function. For example, the anchor point removal system 102 utilizes an objective function to determine the magnitudes α and β based on parametric values t for the new segment r between 0 (which corresponds to the endpoint $r_1$ in Euclidean space) and 1 (which corresponds to the endpoint $r_4$ in Euclidean space). Indeed, the anchor point removal system 102 implements the objective function:

$$F(\alpha, \beta, t_r) = \frac{1}{2}\left(\int_0^{t_r}\left\|B(t)r - B\left(\frac{t}{t_r}\right)p\right\|^2 dt + \int_{t_r}^1\left\|B(t)r - B\left(\frac{t-t_r}{1-t_r}\right)q\right\|^2 dt\right)$$

where $t_r$ is the parametric value on the new segment r (or on the modified Bezier spline 502) corresponding to the location of the anchor point 504 to be removed from the initial Bezier spline 500, and where B(t) is the third-degree Bernstein polynomial given by:

$$B(t) = ((1-t)^3, 3t(1-t)^2, 3t^2(1-t), t^3).$$

Figure 6:
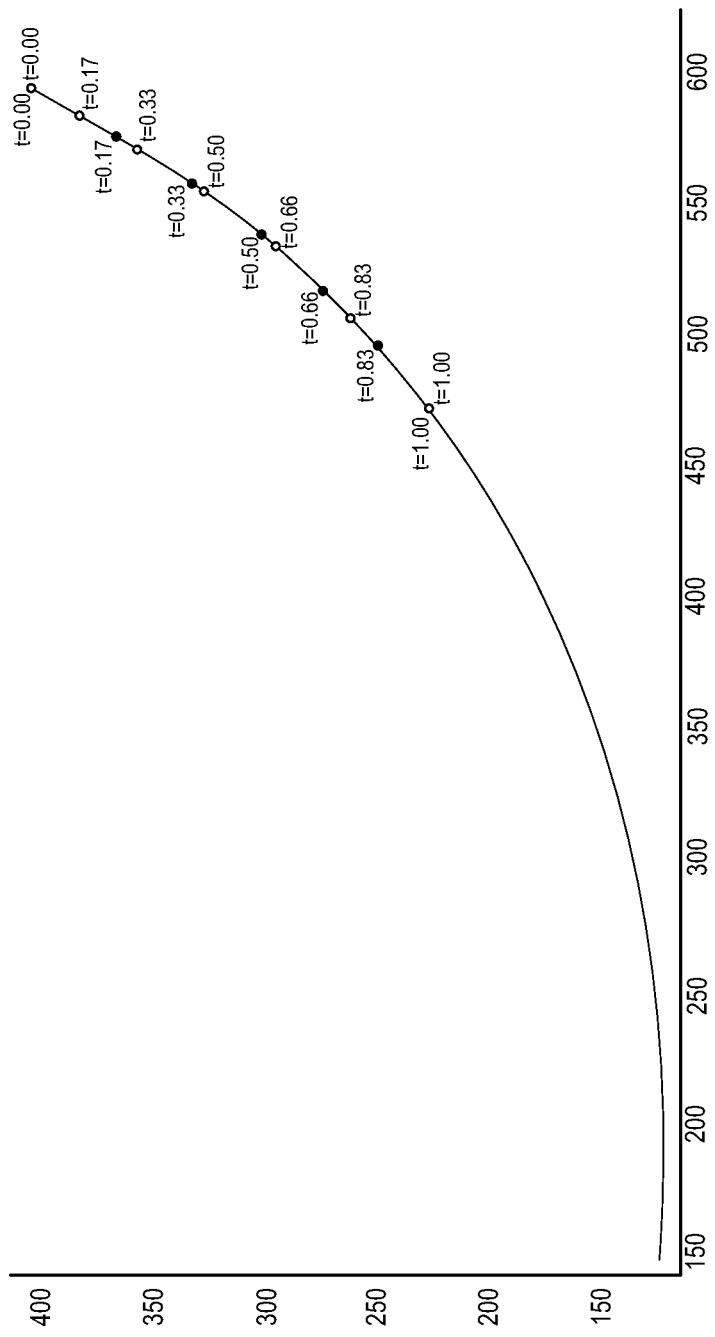
FIG. 6 illustrates alignment of parametric values between input segments and a new segment in accordance with one or more embodiments.

To improve the fit of the new segment r even further (over conventional systems), the anchor point removal system 102 can modify the objective function by sampling at sample positions spaced along the new segment r proportionally to the respective lengths of the two adjacent input segments p and q. Indeed, the anchor point removal system 102 can account for the fact that points that are matched in parametric space may be spaced far away from each other in Euclidean space. FIG. 6 illustrates an example where a new segment completely overlaps two adjacent input segments in accordance with one or more embodiments.

As illustrated in FIG. 6, the adjacent input segments p and q have the following coordinates in Euclidean space:

$$p = [589,404; 576.17, 369.8; 546.28, 292.81; 471, 226] \text{ and}$$

$$q = [471,226; 343.74, 113.06; 186.49, 117.68; 147, 120].$$

In addition, the two adjacent input segments p and q are merged into the new segment r with coordinates of:

$$r = [589,404; 491.26, 143.33; 258.42, 113.47; 147, 120]$$

with a value of $t_r$ at $t_r = 0.301$.

Looking to FIG. 6, it is apparent that points corresponding to the same parametric values t on an adjacent input segment (p or q) and the new segment r are distant in Euclidean space. Indeed, the parametric values for the endpoints align at t=1 and t=0, but the parametric values between the endpoints do not align. As shown, the parametric values designated by the open circles do not align with the parametric values designated by the closed circles. For example, the parametric value t=0.83 for the new segment r does not align with the parametric value t=0.83 for the adjacent input segment. To resolve these misalignments that can occur, the anchor point removal system 102 can utilize a modified objective function to determine α, β, and $t_r$ based on subdividing or sampling the new segment r proportionally to the lengths of the adjacent input segments p and q.

Figure 7:
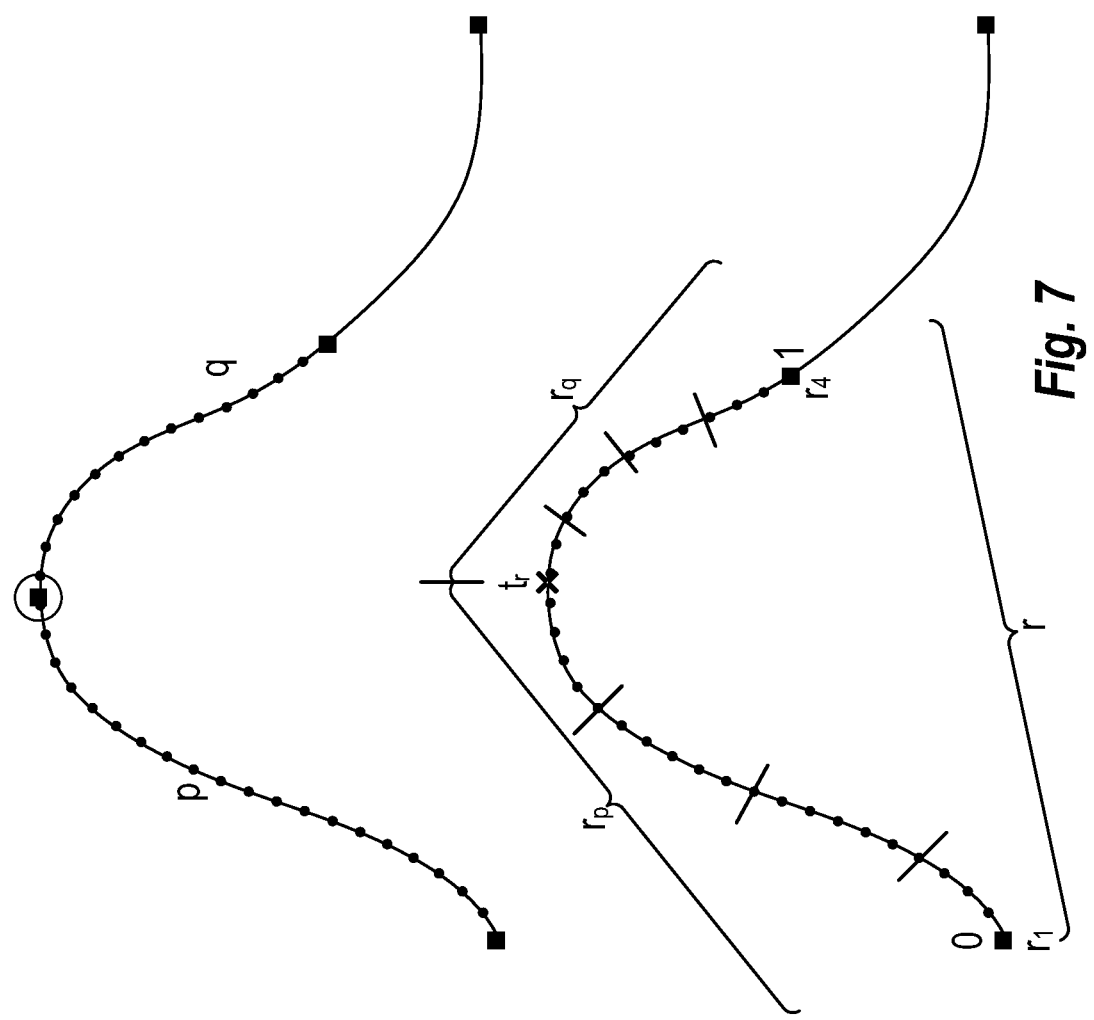
FIG. 7 illustrates sampling or subdividing a new segment proportionally based on lengths of input segments in accordance with one or more embodiments.

As mentioned, the anchor point removal system 102 can determine positions for sampling a new segment based on lengths of input segments. In particular, the anchor point removal system 102 can parameterize segments to determine sample positions for different portions of a new segment, the different portions corresponding to (lengths of) different input segments. In addition, the anchor point removal system 102 can determine tangent vector magnitudes based on the sample positions for determining locations of control points for a new segment to include within a modified Bezier spline. FIG. 7 illustrates subdividing the new segment r based on the respective lengths of the input segments p and q in accordance with one or more embodiments.

As illustrated in FIG. 7, the anchor point removal system 102 uses a length-based subdivision approach. More specifically, the anchor point removal system 102 determines length of the first adjacent input segment p and the length of the second adjacent input segment q. In addition, the anchor point removal system 102 divides the new segment r in proportion to the determined lengths. Particularly, the anchor point removal system 102 divides a first portion $r_p$ of the new segment r (e.g., a portion of the new segment r that corresponds to the first adjacent input segment p) proportionally to the length of the first adjacent input segment p. In addition, the anchor point removal system 102 divides a second portion $r_q$ of the new segment r (e.g., a portion of the new segment r that corresponds to the second adjacent input segment q) proportionally to the length of the second adjacent input segment q. The divided sections of the new segment r are illustrated in FIG. 7 by the intersecting line segments interspersed along the new segment r. Indeed, the anchor point removal system 102 divides the first section $r_p$ of the new segment r to be spaced farther apart than the subdivisions $r_q$ of the second section $r_q$ because the first adjacent input segment p is longer than the second adjacent input segment q.

Additionally, the anchor point removal system 102 subdivides the adjacent input segments p and q and each lengthwise-divided piece or section of the new segment r uniformly along their respective lengths. Thus, the anchor point removal system 102 determines the number of subdivisions $N_1$ for the first adjacent input segment p and the number of subdivisions $N_2$ for the second adjacent input segment q based on the curvature and the length of the two adjacent input segments p and q. The subdivided sections of the new segment r are illustrated in FIG. 7 by the dots along the new segment r. Indeed, as shown, the anchor point removal system 102 subdivides uniformly along the two sections $r_p$ and $r_q$ of the new segment r, as indicated by the even spacing of the dots in FIG. 7. By implementing the lengthwise proportional division technique and the uniform subdivision technique, the anchor point removal system 102 determines parametric values t that more accurately align with corresponding values along the segments in Euclidean space.

To account for the curvature of the two adjacent input segments p and q, the anchor point removal system 102 utilizes De Casteljau subdivision matrices. In particular, the anchor point removal system 102 utilizes a recursive method to divide and subdivide the new segment r (and/or the adjacent input segments p and q) at particular parametric values (e.g., parameter values within t). For example, the anchor point removal system 102 utilizes De Casteljau subdivision matrices in accordance with:

$$S(t_a, t_b) = \frac{D_2(t_a/t_b)}{D_1(t_b)}$$

where $S(t_a, t_b)$ gives the portion of a Bezier segment (e.g., the new segment r) that spans from parametric value $t_a$ to parametric value $t_b$, and where $D_1$ and $D_2$ are De Casteljau subdivision matrices. In some embodiments, the anchor point removal system 102 implements De Casteljau matrices utilizing the technique described by Gerald E. Farin and Dianne Hansford in The *Essentials of CAGD*, A. K. Peters, Ltd., 1st edition (Natick, Mass., USA 2000), which is incorporated herein by reference in its entirety.

By utilizing De Casteljau matrices, the anchor point removal system 102 determines the first portion $r_p$ of the new segment r corresponding to the first adjacent input segment p and the second portion $r_q$ of the new segment r corresponding to the second adjacent input segment q. Particularly, the anchor point removal system 102 determines the portions of the new segment r given by:

$$r_p = S(0, t_r)r \text{ and}$$

$$r_q = S(t_r, 1)r$$

where $S(0, t_r)r$ represents the portion $r_p$ of the new segment r from 0 to the parametric value $t_r$, and where $S(t_r, 1)r$ represents the portion $r_q$ of the new segment r from the parametric value $t_r$ to 1.

As mentioned, the anchor point removal system 102 further determines the parametric values for $r_p$, p, $r_q$, and q by subdividing uniformly along the lengths at fixed intervals. Particularly, the anchor point removal system 102 determines the parametric values corresponding to sample positions indicated by the subdivisions of $r_p$, as given by:

$$\forall i \in N_1 p_i = S(t_i, t_{i+1})p$$

$$\forall i \in N_1 r_{p_i} = S(t_i, t_{i+1})r_p$$

where $$\frac{\text{Length}(p_i)}{\text{Length}(p)} = \frac{\text{Length}(r_{pi})}{\text{Length}(r_p)}; \forall i \in N_1$$

and where $N_1$ is the is the number of subdivisions or sample points along the first portion $r_p$ of the new segment r.

Similarly, the anchor point removal system 102 determines the parametric values corresponding to sample positions indicated by the subdivisions of $r_q$, as given by:

$$\forall j \in N_2 q_j = S(t_j, t_{j+1})q$$

$$\forall j \in N_2 r_{q_j} = S(t_j, t_{j+1})r_q$$

where $$\frac{\text{Length}(q_j)}{\text{Length}(q)} = \frac{\text{Length}(r_{qj})}{\text{Length}(r_q)}; \forall j \in N_2$$

and where $N_2$ is the is the number of subdivisions or sample points along the first portion $r_q$ of the new segment r.

By determining the parametric values corresponding to the various subdivision/sample points in this way, the anchor point removal system 102 accommodates the difference in positions of subdivision/sample points between the adjacent input segments p and q and the new segment r. Indeed, by sampling in accordance with the subdivision technique described above, the anchor point removal system 102 modifies the objective function to utilize an objective function of the form:

$$F(\alpha, \beta, t_r) = \frac{1}{2}\left(\sum_{i=1}^{N_1} \int_0^1 \|B(t)r_{p_i} - B(t)p_i\|^2 dt + \sum_{j=1}^{N_2} \int_0^1 \|B(t)r_{q_j} - B(t)q_j\|^2 dt\right)$$

where the terms are defined above. As shown in the objective function above, the anchor point removal system 102 divides the new segment r and further subdivides the divided sections over which to integrate for determining tangent vectors. The anchor point removal system 102 further combines (e.g., sums) the results for each subdivided piece or section of the new segment r for each of the first portion r, and the second portion $r_q$ of the new segment r. In some embodiments, the anchor point removal system 102 adds a regularization term with an empirical weight to the above objective function to ensure positive values for $\alpha$ and $\beta$. Indeed, the anchor point removal system 102 can utilize a regularization term that penalizes the objective function for values of $\alpha <$ Length($p_0$, $p_1$) and for values of $\beta <$ Length($q_3$, $q_4$). In one or more implementations, the regularization term includes an empirical weight (e.g., a numerical value such as 1000) as a multiplier for a decrease in handle length (e.g., 1000×(decrease in Length ($p_0$,$p_1$)) or 1000×(decrease in Length($q_3$, $q_4$))). Utilizing this technique, the anchor point removal system 102 determines values for $\alpha$, $\beta$, and $t_r$.

To utilize (e.g., minimize) the objective function, the anchor point removal system 102 applies a Nelder-Mead technique as described by J. A. Nelder and R. Mead in *A Simplex Method for Function Minimization*, The Computer Journal, 7(4), 308-13 (1965), which is incorporated herein by reference in its entirety. In particular, the anchor point removal system 102 takes $\alpha$, $\beta$, and $t_r$ as input and determines a cost, which is indicative of a measure of tightness of fitting (or a minimization of deviation) of the new segment r with respect to the adjacent input segments p and q. In some embodiments, the anchor point removal system 102 utilizes initialization values for $\alpha$, $\beta$, and $t_r$ such as Length($p_0$, $p_1$), Length($q_3$, $q_4$), and 0.5, respectively. Implementing the above objective function, the anchor point removal system 102 determines magnitudes of the tangent vectors 510 and 512 to thereby determine locations for control points for the new segment r. From the control points, the anchor point removal system 102 generates the modified Bezier spline 502 including the new segment r in place of the two adjacent input segments p and q of the initial Bezier spline 500.

By utilizing the above objective function, the anchor point removal system 102 provides advantages in accuracy and efficiency as described above, with particular reference to FIGS. 3A-3B and FIGS. 4A-4B. Indeed, by proportionally dividing the new segment r based on lengths of p and q and further subdividing the divided portions evenly along their lengths, the anchor point removal system 102 generates a modified Bezier spline 502 that more closely resembles the initial Bezier spline 500 as compared to conventional systems. As a result, the anchor point removal system 102 further improves efficiency by requiring fewer user interactions to fix the shape of the modified Bezier spline 502. In addition, by utilizing the above-described subdivision and the resulting objective function for determining control point locations, the anchor point removal system 102 does not retract handles when removing anchor points, which further improves over conventional systems.

Figure 8:
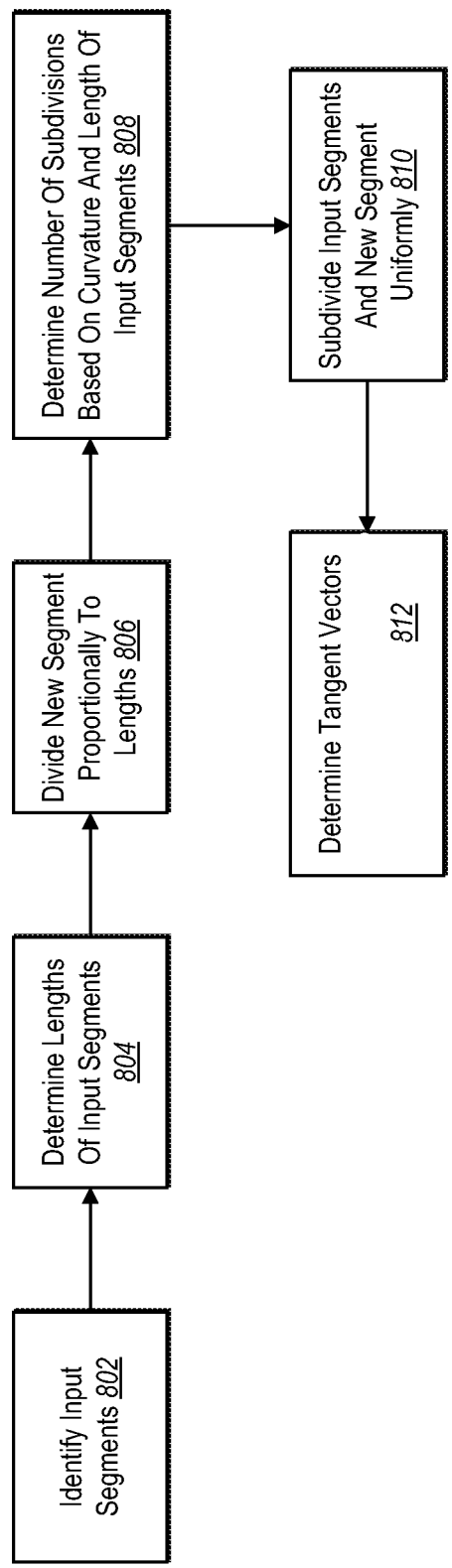
FIG. 8 illustrates a sequence of acts in a process of generating a modified Bezier spline by removing an anchor point in accordance with one or more embodiments.

As mentioned, the anchor point removal system 102 can remove an anchor point from an initial Bezier spline utilizing the above objective function. In particular, the anchor point removal system 102 can replace input segments with a new segment based on sampling the new segment proportionally to the lengths of the input segments and generating tangent vectors at the sample positions. FIG. 8 illustrates a sequence of acts 802-812 for removing an anchor point from a Bezier spline in accordance with one or more embodiments.

As illustrated in FIG. 8, the anchor point removal system 102 performs an act 802 to identify input segments. In particular, the anchor point removal system 102 identifies the input segments p and q that are adjacent to each other. The anchor point removal system 102 determines that the input segments p and q are on either side of an anchor point to be removed (e.g., the anchor point 504), as described above.

In addition, the anchor point removal system 102 performs an act 804 to determine lengths of the input segments. In particular, the anchor point removal system 102 determines a length of a first adjacent input segment p and a length of a second adjacent input segment q. The anchor point removal system 102 further utilizes the determined lengths in proportionally sampling a new segment r to replace the two adjacent input segments p and q.

Indeed, the anchor point removal system 102 performs an act 806 to divide the new segment r proportionally to the lengths of p and q. Particularly, as described above, the anchor point removal system 102 divides a first portion $r_p$ and a second portion $r_q$ of the new segment r proportionally to the lengths of the respective adjacent input segments p and q. In addition, the anchor point removal system 102 performs an act 808 to determine a number of subdivisions based on curvatures and lengths of the adjacent input segments p and q. For example, the anchor point removal system 102 determines the values of $N_1$ and $N_2$ based on the lengths of the input segments p and q.

As shown in FIG. 8, the anchor point removal system 102 also performs an act 810 to subdivide the input segments p and q and the new segment r uniformly. Particularly, the anchor point removal system 102 subdivides p, q, and r uniformly along their respective lengths as described above in relation to FIG. 7. Further, the anchor point removal system 102 performs an act 812 to determine tangent vectors for the new segment r. More specifically, the anchor point removal system 102 determines directions for tangent vectors of the new segment r based on directions of tangent vectors of the adjacent input segments p and q. In addition, the anchor point removal system 102 utilizes an objective function to determine magnitudes of the tangent vectors. Additional detail regarding determining directions for tangent vectors is provided above in relation to FIG. 5, and additional detail regarding determining magnitudes of the tangent vectors utilizing an objective function is provided above in relation to FIG. 7.

In some embodiments, the anchor point removal system 102 can perform a step for removing the anchor point while preserving a shape of the initial Bezier spline. The above description of FIG. 8, including the acts 802-812 as well as the corresponding description of FIG. 5 and FIG. 7 (which provide specific algorithms for the acts 802-812) can provide structure, algorithms, or acts for performing a step for removing the anchor point while preserving a shape of the initial Bezier spline.

Figure 9A:
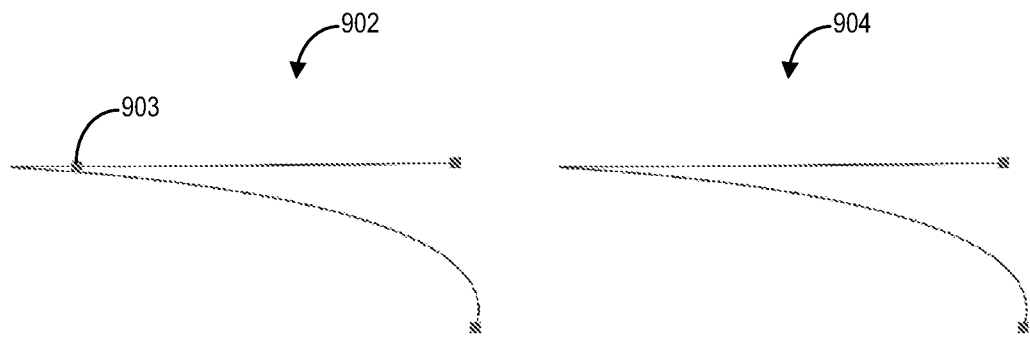
FIGS. 9A-9B illustrate diagrams of automatically removing contiguous anchor points from a Bezier spline in accordance with one or more embodiments.
Figure 9B:
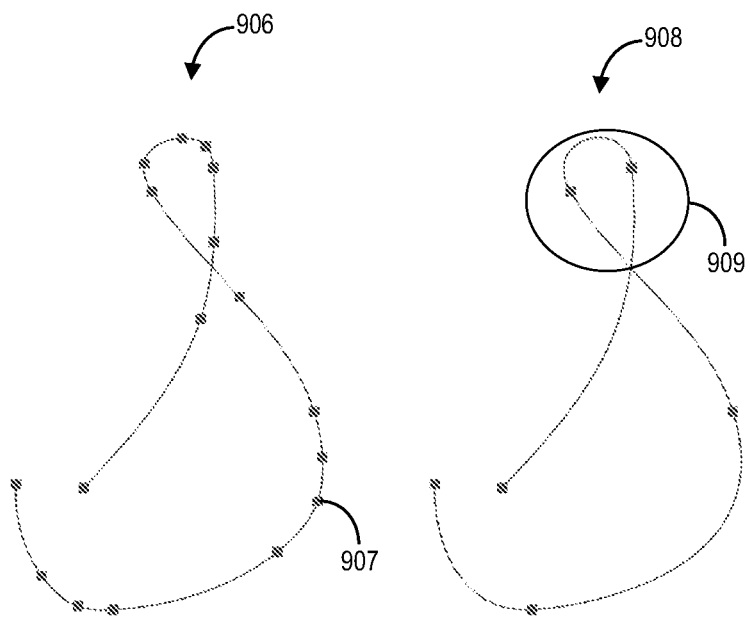

As mentioned above, the anchor point removal system 102 can extend the solution obtained via the objective function to remove multiple anchor points. In particular, the anchor point removal system 102 can analyze an initial Bezier spline to automatically identify (e.g., without user input to select) multiple contiguous anchor points to remove. FIGS. 9A and 9B illustrate examples of automatically removing one or more anchor points from a Bezier spline in accordance with one or more embodiments.

As illustrated in FIG. 9A, the anchor point removal system 102 identifies three anchor points indicated by squares on the initial Bezier spline 902. The anchor point removal system 102 further analyzes the anchor points and the initial Bezier spline 902 to automatically identify the anchor point 903 to remove. Upon identifying the anchor point 903 to remove, the anchor point removal system 102 generates the modified Bezier spline 904 without the anchor point 903.

To elaborate, the anchor point removal system 102 utilizes the Nelder-Mead objective function described above based on lengthwise proportional sampling. For applying the objective function to remove a number of contiguous anchor points, the anchor point removal system 102 determines the parametric value $t_r$ to simplify the above objective function to solve for only two unknowns: $\alpha$ and $\beta$. To determine the parametric value $t_r$ and thereby simplify the objective function for application to automatically remove multiple anchor points, the anchor point removal system 102 divides a new segment (e.g., a new segment to replace adjacent input segments on either side of the anchor point 903) lengthwise in proportion to the lengths of the adjacent input segments.

Indeed, the anchor point removal system 102 divides a first portion of the new segment proportionally to the length of a first adjacent input segment and divides a second portion of the new segment proportionally to the length of the second adjacent input segment. Subsequently, the anchor point removal system 102 further subdivides the divided sections of the new segment and the adjacent input segments uniformly (e.g., at fixed intervals) along their lengths. The anchor point removal system 102 further applies the above objective function to determines magnitudes of tangent vectors based on the subdivisions. Thus, the anchor point removal system 102 generates the modified Bezier spline 904 by replacing adjacent input segments on either side of the anchor point 903 (and other anchor points to be removed) with corresponding new segments.

As shown in FIG. 9B, the anchor point removal system 102 performs an operation similar to that of FIG. 9A but with more anchor points. Indeed, the anchor point removal system 102 can scale the automatic removal of contiguous anchor points for Bezier splines with large numbers of anchor points. As shown in FIG. 9B, for instance, the anchor point removal system 102 identifies a plurality of segments separated by (or connected at) the various anchor points to be removed. For example, the anchor point removal system 102 identifies a pair of adjacent input segments for each anchor point to be removed such as segments on either side of the anchor point 907.

Indeed, given N input segments $p_1, p_2, \ldots, p_N$, the anchor point removal system 102 determines parametric values $t_{r_1}, t_{r_2}, \ldots, t_{r_N}$ corresponding to anchor points to be removed. The anchor point removal system 102 further subdivides the new segment r (e.g., a new segment between two anchor points that are not to be removed) into new sub-segments $r_1, r_2, \ldots, r_N$ (e.g., sub-segments that are between anchor points to be removed) such that:

$$\frac{\text{Length}(p_i)}{\text{Length}(p)} = \frac{\text{Length}(r_i)}{\text{Length}(r)}.$$

Thus, the anchor point removal system 102 subdivides the new segment r into a number of sub-segments equal to the number of input segments. For each anchor point to remove (or for each pair of adjacent input segments to replace with a new segment), the anchor point removal system 102 further applies the above objective function generate magnitudes of tangent vectors based on the new sub-segments. Thus, the anchor point removal system 102 generates the modified Bezier spline 908 with new sub-segments replacing adjacent input segments for each removed anchor point.

As further illustrated in FIG. 9B, the anchor point removal system 102 accurately generates the modified Bezier spline 908 to resemble the initial Bezier spline 906. Indeed, the anchor point removal system 102 subdivides the new segment r and applies the above objective function to generate the modified Bezier spline 908 by removing anchor points while retaining the loop 909 within the spline, unlike many conventional systems that are unable to reproduce loops or cusps when removing anchor points (or at least do so with a high degree of similarity).

Figure 10:
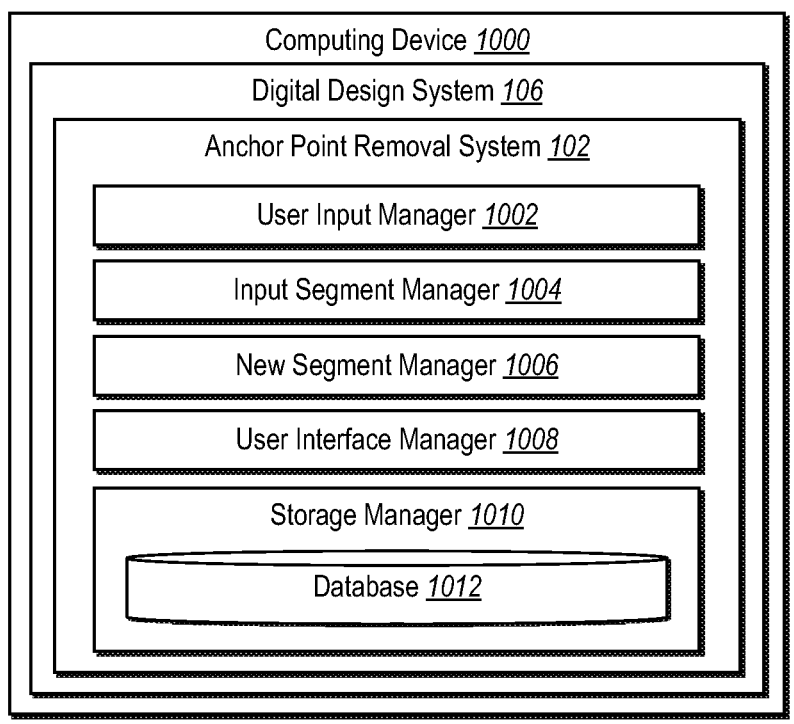
FIG. 10 illustrates a schematic diagram of an anchor point removal system in accordance with one or more embodiments.

Looking now to FIG. 10, additional detail will be provided regarding components and capabilities of the anchor point removal system 102. Specifically, FIG. 10 illustrates an example schematic diagram of the anchor point removal system 102 on an example computing device 1000 (e.g., one or more of the client device 108 and/or the server(s) 104). As shown in FIG. 10, the anchor point removal system 102 may include a user input manager 1002, an input segment manager 1004, a new segment manager 1006, a user interface manager 1008, and a storage manager 1010. The storage manager 1010 can operate in conjunction with one or more memory devices (e.g., the database 1012) that store various data such as locations of anchor points for an initial Bezier spline and one or more segments of the Bezier spline spanning between anchor points.

As just mentioned, the anchor point removal system 102 includes a user input manager 1002. In particular, the user input manager 1002 can manage, detect, receive, determine, monitor, or otherwise identify user input. For example, the user input manager 1002 can identify user input such as a user interaction within the client application 110 to selection and/or remove an anchor point from a Bezier spline. In some embodiments, the user input manager 1002 identifies user input in the form of a selection to simplify or clean up a Bezier spline. Based on the selection to simplify or clean up a Bezier spline, the user input manager 1002 communicates with other components of the anchor point removal system 102 to automatically remove a number of contiguous anchor points.

As also mentioned, the anchor point removal system 102 includes an input segment manager 1004. In particular, the input segment manager 1004 manages, maintains, determines, distinguishes, analyzes, samples, divides, subdivides, or identifies input segments. For example, the input segment manager 1004 analyzes an initial Bezier spline to identity adjacent input segments that are connected at an anchor point to be removed. The input segment manager 1004 further samples, divides, and/or subdivides adjacent input segments for generating a new segment to replace the adjacent input segments, as described above.

As shown, the anchor point removal system 102 also includes a new segment manager 1006. In particular, the new segment manager 1006 manages, maintains, analyzes, identifies, determines, generates, samples, divides, or subdivides a new segment. For example, the new segment manager 1006 generates a new segment to replace adjacent input segments. Indeed, the new segment manager 1006 generates a modified Bezier spline that includes a new segment in place of adjacent input segments of an initial Bezier spline. In addition, the new segment manager 1006 samples or subdivides a new segment based on lengths of adjacent input segments, as set forth in more detail above.

The anchor point removal system 102 further includes a user interface manager 1008. In particular, the user interface manager 1008 manages, maintains, provides, presents, displays, renders, or generates one or more user interfaces for display on the client device 108. For example, the user interface manager 1008 provides an anchor point removal interface for display within the client application 110 whereby a user can provide user interactions to remove anchor points from a Bezier spline.

The components of the anchor point removal system 102 can include software, hardware, or both. For example, the components of the anchor point removal system 102 can include one or more instructions stored on a computer-readable storage medium and executable by processors of one or more computing devices (e.g., the computing device 1000). When executed by the one or more processors, the computer-executable instructions of the anchor point removal system 102 can cause the computing device 1000 to perform the methods described herein. Alternatively, the components of the anchor point removal system 102 can comprise hardware, such as a special purpose processing device to perform a certain function or group of functions. Additionally or alternatively, the components of the anchor point removal system 102 can include a combination of computer-executable instructions and hardware.

Furthermore, the components of the anchor point removal system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the anchor point removal system 102 may be implemented as part of a stand-alone application on a personal computing device or a mobile device. Alternatively or additionally, the components of the anchor point removal system 102 may be implemented in any application that allows creation and delivery of marketing content to users, including, but not limited to, applications in ADOBE EXPERIENCE MANAGER, ADOBE DOCUMENT CLOUD, and ADOBE CREATIVE CLOUD, such as ADOBE ILLUSTRATOR, ADOBE PHOTOSHOP, and ADOBE INDESIGN. "ADOBE," "ADOBE EXPERIENCE MANAGER," "ADOBE DOCUMENT CLOUD," "ADOBE CREATIVE CLOUD," "ADOBE ILLUSTRATOR," "ADOBE PHOTOSHOP," and "ADOBE INDESIGN" are trademarks of Adobe Inc. in the United States and/or other countries FIGS. 1-10, the corresponding text, and the examples provide a number of different systems, methods, and non-transitory computer readable media for removing an anchor point from a Bezier spline while preserving the shape of the Bezier spline. In addition to the foregoing, embodiments can also be described in terms of flowcharts comprising acts for accomplishing a particular result. For example, FIG. 11 illustrates a flowchart of an example sequence or series of acts in accordance with one or more embodiments.

Figure 11:
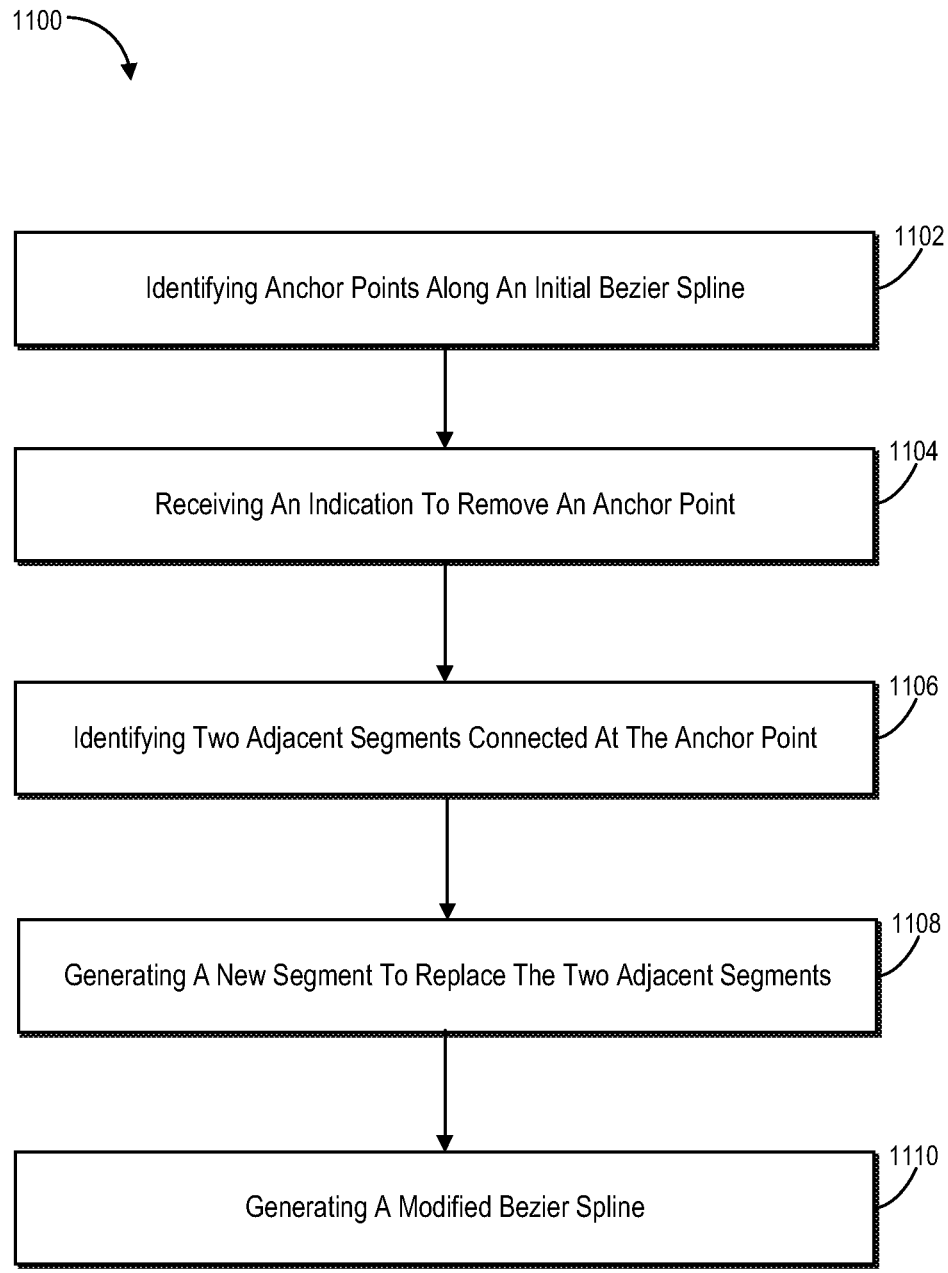
FIG. 11 illustrates a flowchart of a series of acts of removing an anchor point from a Bezier spline while preserving the shape of the Bezier spline in accordance with one or more embodiments.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for removing an anchor point from a Bezier spline while preserving the shape of the Bezier spline. In particular, the series of acts 1100 includes an act 1102 of identifying anchor points along an initial Bezier spline. For example, the act 1102 can involve identifying a plurality of anchor points along an initial Bezier spline.

In addition, the series of acts 1100 includes an act 1104 of receiving an indication to remove an anchor point. In particular, the act 1104 can involve receiving an indication to remove an anchor point of the plurality of anchor points along the initial Bezier spline. The act 1104 can involve receiving a user interaction selecting the anchor point from within a user interface. The act 1104 can also (or alternatively) include automatically identifying the anchor point without user input selecting the anchor point.

As shown, the series of acts 1100 also includes an act 1106 of identifying two adjacent segments connected at the anchor point. In particular, the act 1106 can involve, in response to the indication, identifying two adjacent segments of the initial Bezier spline that are connected at the anchor point to be removed.

The series of acts 1100 further includes an act 1108 of generating a new segment to replace the two adjacent segments. In particular, the act 1108 can involve generating a new segment that reduces deviation in relation to a combination of the two adjacent segments. For example, the act 1108 can involve determining sample positions along the new segment spaced proportionally to lengths of the two adjacent segments and determining locations for control points of the new segment in accordance with the sample positions. The act 1108 can also involve determining the locations for the control points of the new segment by determining, from the sample positions along the new segment, tangent vectors that reduce deviation of the new segment with respect to the two adjacent segments. Further, the act 1108 can involve determining magnitudes for the tangent vectors utilizing an objective function with a regularization term. Determining magnitudes for the tangent vectors can include implementing an objective function comprising a regularization term to ensure that the magnitudes of the tangent vectors are positive. Determining the sample positions can include subdividing the new segment based on the respective lengths of the two adjacent segments and further based on curvatures of the two adjacent segments.

In some embodiments, the act 1108 includes determining two control points for the new segment at endpoints corresponding to endpoints of the two adjacent segments and determining two additional control points for the new segment based on lengths of the two adjacent segments of the initial Bezier spline. For example, the act 1108 includes an act of generating the new segment to replace the first adjacent segment and the second adjacent segment by determining a first control point for the new segment at a position corresponding to an endpoint of the first adjacent segment, determining a second control point for the new segment at a position corresponding to an endpoint of the second adjacent segment, and determining two additional control points for the new segment at positions indicated by the tangent vectors.

In these or other embodiments, the act 1108 can involve, in response to the indication to remove the anchor point, removing the anchor point while preserving a shape of the initial Bezier spline. Removing the anchor point while preserving the shape of the initial Bezier spline can include identifying a first adjacent segment and a second adjacent segment of the initial Bezier spline that are connected at the anchor point to be removed, sampling a new segment that is to replace the first adjacent segment and the second adjacent segment along a first portion proportionally to a length of the first adjacent segment and along a second portion proportionally to a length of the second adjacent segment, and determining, from sampled positions along the first portion and the second portion of the new segment, tangent vectors that indicate locations for control points of the new segment (and that reduce deviation of the new segment from a combination of the first adjacent segment and the second adjacent segment).

Sampling the new segment can include generating a first set of parametric values at intervals along the first portion of the new segment based on the length of the first adjacent segment and generating a second set of parametric values at intervals along the second portion of the new segment based on the length of the second adjacent segment. Determining the tangent vectors that reduce deviation of the new segment from a combination of the first adjacent segment and the second adjacent segment can include determining directions of tangent vectors between control points of the first adjacent segment and between control points of the second adjacent segment, matching directions of the tangent vectors for the new segment to the directions of the tangent vectors between the control points of the first adjacent segment and between the control points of the second adjacent segment, and utilizing the first set of parametric values and the second set of parametric values to determine magnitudes of the tangent vectors for the new segment.

Additionally, the series of acts 1100 includes an act 1110 of generating a modified Bezier spline. In particular, the act 1110 can involve generating a modified Bezier spline comprising the new segment in place of the two adjacent segments. In some embodiments, the series of acts 1100 includes an act of providing the modified Bezier spline for display on a client device. The act 1110 can involve generating a modified Bezier spline comprising the new segment in place of the first adjacent segment and the second adjacent segment. The act 1110 can also (or alternatively) involve replacing the first adjacent segment with the first portion of the new segment and replacing the second adjacent segment with the second portion of the new segment.

In some embodiments, the series of acts 1100 includes an act of identifying a plurality of segments spanning between the plurality of anchor points along the initial Bezier spline. In addition, the series of acts 1100 includes an act of determining to remove multiple anchor points of the plurality of anchor points. Further, the series of acts 1100 includes an act of, based on determining to remove multiple anchor points, determining parametric values along an additional Bezier segment corresponding to positions of the multiple anchor points to be removed by: dividing the additional Bezier segment proportionally based on lengths of the plurality of segments of the initial Bezier spline; and subdividing the additional Bezier segment into a plurality of new sub-segments equal in number to the plurality of segments of the initial Bezier spline. In some embodiments, the series of acts 1100 includes an act of determining control points for the additional Bezier segment utilizing an objective function to determine tangent vectors indicating the control points from the parametric values of the additional Bezier segment. The series of acts 1100 can further include an act of replacing the plurality of segments with the additional Bezier segment.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
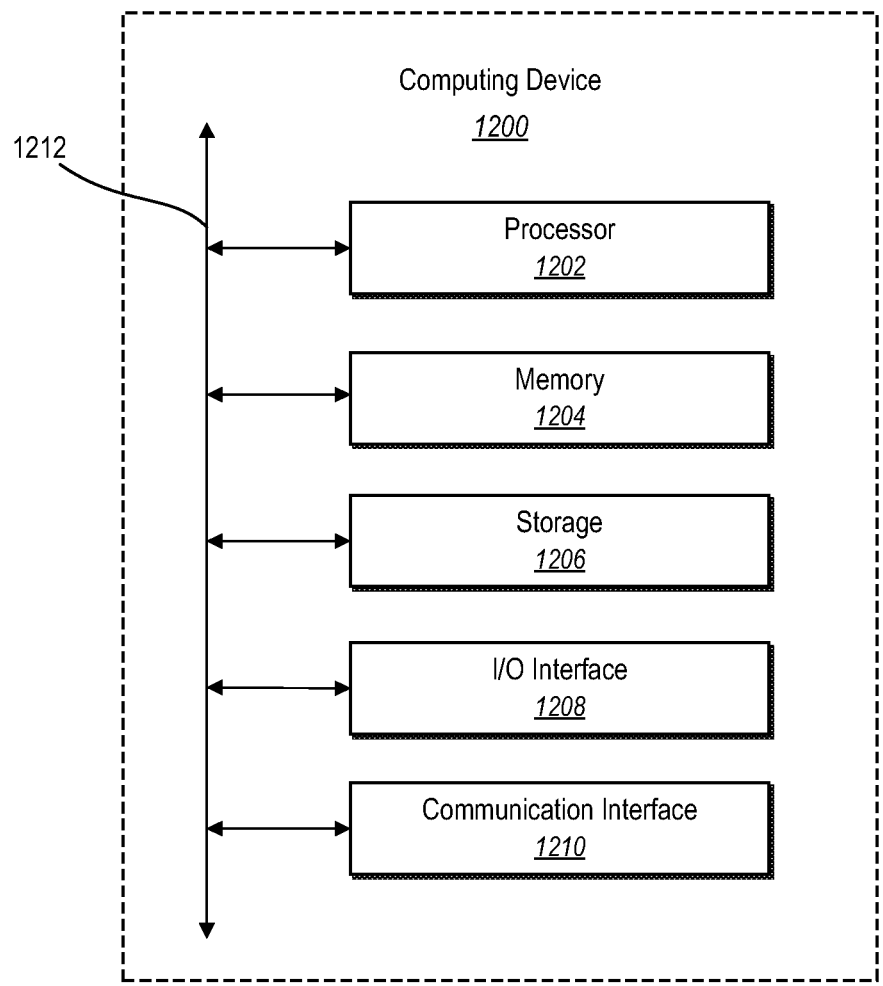
FIG. 12 illustrates a block diagram of an example computing device in accordance with one or more embodiments.

FIG. 12 illustrates, in block diagram form, an example computing device 1200 (e.g., the computing device 1000, the client device 108, and/or the server(s) 104) that may be configured to perform one or more of the processes described above. One will appreciate that the anchor point removal system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   identify a plurality of anchor points along an initial Bezier spline;
   receive an indication to remove an anchor point of the plurality of anchor points along the initial Bezier spline;
   in response to the indication, identify two adjacent segments of the initial Bezier spline that are connected at the anchor point to be removed;
   generate a new segment that removes the anchor point and reduces deviation in relation to a combination of the two adjacent segments by determining control points for the new segment according to sample positions along the new segment spaced proportionally to lengths of the two adjacent segments; and
   generate a modified Bezier spline comprising the new segment in place of the two adjacent segments.

2. The non-transitory computer readable medium of claim 1,
   further comprising instructions that, when executed by the at least one processor, cause the computing device to determine the sample positions along the new segment by:
   determining a first set of sample positions according to a length of a first adjacent segment of the two adjacent segments; and
   determining a second set of sample positions according to a length of a second adjacent segment of the two adjacent segments.

3. The non-transitory computer readable medium of claim 1, further comprising instructions that, when executed by the at least one processor, cause the computing device to determine locations for the control points of the new segment by determining, from the sample positions along the new segment, tangent vectors that reduce deviation of the new segment with respect to the two adjacent segments.

4. The non-transitory computer readable medium of claim 3, further comprising instructions that, when executed by the at least one processor, cause the computing device to determine magnitudes for the tangent vectors utilizing an objective function with a regularization term.

5. The non-transitory computer readable medium of claim 1, further comprising instructions that, when executed by the at least one processor, cause the computing device to determine the sample positions by subdividing the new segment based on respective lengths of the two adjacent segments and further based on curvatures of the two adjacent segments.

6. The non-transitory computer readable medium of claim 1, further comprising instructions that, when executed by the at least one processor, cause the computing device to:
identify a plurality of segments spanning between the plurality of anchor points along the initial Bezier spline;
determine to remove multiple anchor points of the plurality of anchor points;
based on determining to remove multiple anchor points, determine parametric values along an additional Bezier segment corresponding to positions of the multiple anchor points to be removed by:
dividing the additional Bezier segment proportionally based on lengths of the plurality of segments of the initial Bezier spline; and
subdividing the additional Bezier segment into a plurality of new sub-segments equal in number to the plurality of segments of the initial Bezier spline;
determine control points for the additional Bezier segment utilizing an objective function to determine tangent vectors indicating the control points from the parametric values of the additional Bezier segment; and
replace the plurality of segments with the additional Bezier segment.

7. The non-transitory computer readable medium of claim 1, further comprising instructions that, when executed by the at least one processor, cause the computing device to generate the new segment by:
determining two control points for the new segment at endpoints corresponding to endpoints of the two adjacent segments; and
determining two additional control points for the new segment based on the lengths of the two adjacent segments of the initial Bezier spline.

8. The non-transitory computer readable medium of claim 1, further comprising instructions that, when executed by the at least one processor, cause the computing device to provide the modified Bezier spline for display on a client device.

9. A system comprising:
one or more memory devices comprising locations of anchor points for an initial Bezier spline and one or more segments of the initial Bezier spline spanning between anchor points; and
one or more computing devices that are configured to cause the system to:
identify a plurality of anchor points along the initial Bezier spline;
receive an indication to remove an anchor point of the plurality of anchor points along the initial Bezier spline;
in response to the indication, remove the anchor point while preserving a shape of the initial Bezier spline by:
identifying a first adjacent segment and a second adjacent segment of the initial Bezier spline that are connected at the anchor point to be removed;
sampling a new segment that is to replace the first adjacent segment and the second adjacent segment along a first portion proportionally to a length of the first adjacent segment and along a second portion proportionally to a length of the second adjacent segment; and
determining, from sampled positions along the first portion and the second portion of the new segment, tangent vectors that indicate locations for control points of the new segment; and
generate a modified Bezier spline comprising the new segment in place of the first adjacent segment and the second adjacent segment.

10. The system of claim 9, wherein the one or more computing devices are further configured to cause the system to generate the new segment to replace the first adjacent segment and the second adjacent segment by:
determining a first control point for the new segment at a position corresponding to an endpoint of the first adjacent segment;
determining a second control point for the new segment at a position corresponding to an endpoint of the second adjacent segment; and
determining two additional control points for the new segment at positions indicated by the tangent vectors.

11. The system of claim 9, wherein the one or more computing devices are further configured to cause the system to determine magnitudes for the tangent vectors by implementing an objective function comprising a regularization term to ensure that the magnitudes of the tangent vectors are positive.

12. The system of claim 9, wherein the one or more computing devices are further configured to cause the system to generate the modified Bezier spline by:
replacing the first adjacent segment with the first portion of the new segment; and
replacing the second adjacent segment with the second portion of the new segment.

13. The system of claim 9, wherein sampling the new segment comprises:
generating a first set of parametric values at intervals along the first portion of the new segment based on the length of the first adjacent segment; and
generating a second set of parametric values at intervals along the second portion of the new segment based on the length of the second adjacent segment.

14. The system of claim 13, wherein determining the tangent vectors that indicate the locations for the control points of the new segment comprises:
determining directions of tangent vectors between control points of the first adjacent segment and between control points of the second adjacent segment;
matching directions of the tangent vectors for the new segment to the directions of the tangent vectors between the control points of the first adjacent segment and between the control points of the second adjacent segment; and
utilizing the first set of parametric values and the second set of parametric values to determine magnitudes of the tangent vectors for the new segment.

15. The system of claim 9, wherein the one or more computing devices are further configured to cause the system to:
- identify a plurality of segments spanning between the plurality of anchor points along the initial Bezier spline;
- determine to remove multiple anchor points of the plurality of anchor points;
- based on determining to remove multiple anchor points, determine parametric values along an additional Bezier segment corresponding to positions of the multiple anchor points to be removed by:
  - dividing the additional Bezier segment proportionally based on lengths of the plurality of segments of the initial Bezier spline; and
  - subdividing the additional Bezier segment into a plurality of new sub-segments equal in number to the plurality of segments of the initial Bezier spline;
- determine control points for the additional Bezier segment utilizing an objective function to determine tangent vectors indicating the control points from the parametric values of the additional Bezier segment; and
- replace the plurality of segments with the additional Bezier segment.

16. A computer-implemented method for removing anchor points from Bezier splines, the computer-implemented method comprising:
- identifying a plurality of anchor points along an initial Bezier spline;
- receiving an indication to remove an anchor point of the plurality of anchor points along the initial Bezier spline;
- in response to the indication, identifying two adjacent segments of the initial Bezier spline that are connected at the anchor point to be removed;
- generating a new segment that removes the anchor point and reduces deviation in relation to a combination of the two adjacent segments by determining control points for the new segment according to sample positions along the new segment spaced proportionally to lengths of the two adjacent segments; and
- generating a modified Bezier spline comprising the new segment in place of the two adjacent segments.

17. The computer-implemented method of claim 16, further comprising providing the modified Bezier spline for display on a client device.

18. The computer-implemented method of claim 16, wherein receiving the indication to remove the anchor point comprises receiving a user interaction selecting the anchor point from within a user interface.

19. The computer-implemented method of claim 16, wherein receiving the indication to remove the anchor point comprises automatically identifying the anchor point without user input selecting the anchor point.

20. The computer-implemented method of claim 16, further comprising determining the sample positions by subdividing the new segment based on respective lengths of the two adjacent segments and further based on curvatures of the two adjacent segments.

* * * * *